US 6,557,096 B1

(12) United States Patent
Ganapathy et al.

(10) Patent No.: US 6,557,096 B1
(45) Date of Patent: Apr. 29, 2003

(54) PROCESSORS WITH DATA TYPER AND ALIGNER SELECTIVELY COUPLING DATA BITS OF DATA BUSES TO ADDER AND MULTIPLIER FUNCTIONAL BLOCKS TO EXECUTE INSTRUCTIONS WITH FLEXIBLE DATA TYPES

(75) Inventors: Kumar Ganapathy, Mountain View, CA (US); Ruban Kanapathipillai, Dublin, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/652,556

(22) Filed: Aug. 31, 2000

Related U.S. Application Data

(63) Continuation-in-part of application No. 09/494,608, filed on Jan. 31, 2000, now Pat. No. 6,446,145, and a continuation-in-part of application No. 09/427,174, filed on Oct. 25, 1999, now Pat. No. 6,330,660.

(51) Int. Cl.⁷ .............................................. G06F 9/302
(52) U.S. Cl. ........................ 712/221; 708/513; 708/518; 712/210; 712/300
(58) Field of Search ........................... 708/513, 518; 712/210, 221, 300

(56) References Cited

U.S. PATENT DOCUMENTS

| 4,068,299 A | 1/1978 | Bachman .................... 707/101 |
| 4,219,874 A | 8/1980 | Gusev et al. ................ 712/300 |
| 4,456,955 A | 6/1984 | Yanagita et al. ............ 712/300 |
| 4,969,118 A | 11/1990 | Montoye et al. ............. 712/202 |
| 5,142,677 A | 8/1992 | Ehlig et al. ................. 709/108 |
| 5,241,492 A | 8/1993 | Girardeau, Jr. .............. 710/52 |
| 5,341,374 A | 8/1994 | Lewen et al. ............... 709/108 |
| 5,499,272 A | 3/1996 | Bottomley .................. 712/230 |
| 5,530,663 A | 6/1996 | Garcia et al. ................ 708/501 |
| 5,541,917 A | 7/1996 | Farris ......................... 370/352 |
| 5,559,793 A | 9/1996 | Maitra et al. ............... 370/286 |
| 5,574,927 A | 11/1996 | Scantlin ........................ 712/41 |
| 5,638,524 A | 6/1997 | Kiuchi et al. ................ 712/221 |
| 5,727,194 A | 3/1998 | Shridhar et al. ............. 712/241 |
| 5,748,977 A | 5/1998 | Kawasaki et al. ............. 712/33 |
| 5,761,470 A | 6/1998 | Yoshida ...................... 712/228 |
| 5,822,613 A | 10/1998 | Takaki et al. .................. 710/7 |
| 5,825,685 A | 10/1998 | Yamane et al. .............. 365/158 |
| 5,826,072 A | 10/1998 | Knapp et al. ............... 712/226 |
| 5,838,931 A | 11/1998 | Regenold et al. ........... 710/306 |
| 5,880,984 A | 3/1999 | Burchfiel et al. ............ 708/501 |
| 5,881,060 A | 3/1999 | Morrow et al. ............. 370/337 |
| 5,887,183 A | 3/1999 | Agarwal et al. ................ 712/2 |
| 5,901,301 A | 5/1999 | Matsuo et al. .............. 712/212 |
| 5,923,871 A | 7/1999 | Gorshtein et al. ........... 712/221 |
| 5,936,872 A | 8/1999 | Fischer et al. .............. 708/622 |
| 5,940,785 A | 8/1999 | Georgiou et al. ........... 702/132 |
| 5,970,094 A | 10/1999 | Lee ............................ 711/149 |
| 5,983,253 A | 11/1999 | Fischer et al. .............. 712/202 |

(List continued on next page.)

OTHER PUBLICATIONS

A. Oppenheim & R. Schafer, Digital Signal Processing; p. 430, 1975, Prentice Hall, Inc.

(List continued on next page.)

*Primary Examiner*—Kenneth S. Kim
(74) *Attorney, Agent, or Firm*—Blakely, Sokoloff, Taylor & Zafman LLP

(57) ABSTRACT

A signal processor with an instruction set architecture (ISA) for flexible data typing, permutation, and type matching of operands. The signal processor includes a data typer and aligner to support flexible data typing, permutation and type matching of operands of the instruction set architecture. The data typer and aligner is selectively configured to align and select one of more sets of data bits from one or more data buses as operands for functional blocks of the signal processor in response to fields of an instruction.

33 Claims, 19 Drawing Sheets

U.S. PATENT DOCUMENTS

| | | | | |
|---|---|---|---|---|
| 5,995,122 | A | | 11/1999 | Hsieh et al. .................. 710/52 |
| 6,029,267 | A | | 2/2000 | Simanapalli et al. ....... 712/228 |
| 6,058,408 | A | | 5/2000 | Fischer et al. .............. 709/108 |
| 6,092,094 | A | * | 7/2000 | Ireton ......................... 708/706 |
| 6,138,136 | A | | 10/2000 | Bauer et al. ................ 712/230 |
| 6,154,828 | A | | 11/2000 | Macri et al. ................ 711/149 |
| 6,209,012 | B1 | | 3/2001 | Baudendistel ............... 708/209 |
| 6,292,886 | B1 | * | 9/2001 | Makineni et al. ........... 712/222 |
| 6,330,660 | B1 | | 12/2001 | Ganapathy et al. ......... 708/501 |

OTHER PUBLICATIONS

J. McCormick, Supporting Predicted Exeuction: Techniques and Tradeoffs, MS Thesis Dept of Electrical & Computer Engineering, Univ of Il May 1996 abstract p 1.

R. Fromm & D. Martin, Instruction Set Architecture, Simulation Infrastructure, and Application Development for Vector IRAM Oct. 15, 1999, web site.

Web based course, Instructions Set Architecture, Oct. 15, 1999, web site www–ee.eng.hawaii.edu/~tep/EE461/Notes/ISA/isa.html.

Rockwell 1984 Data Book, R65C00/21 Dual CMOS Microcomputer and R65C29 Dual CMOS Microprocessor, Section 3–1—3–33, Aug. 1983, Rockwell International.

D. Minoli & Minoli, Delivering Voice over IP Networks, pp. 149–233, 1998, John Wiley & Sons, Inc.

SMJ320C80 DIgital Signal Processor, pp. 1–153, Aug. 1998, Texas Instruments, Houston, TX.

Minoli & Minoli; Chapter 5, Technology and Standards for Low–Bit–Rate Vocoding Methods; Delivering Voice over IP Networks; 1998; pp. 149–233; Robert Ipsen Pub. John Wiley & Sons, Inc.

Patterson & Hennessy; Computer Architecture A Quantitative Approach; 1990 pp. 142–143; Morgan Kaufmann Publishers, Inc.

Kain; Advanced Computer Architecture, A Systems Design Approach; 1996; pp. 16–17; Prentice–Hall, Inc.

Cavanagh; Chapter One, Number Systems, Logic Design and Very Large Scale Integration; Digital Computer Arithmetic; 1984; pp. 1–12 McGraw–Hill Book Company.

Mick & Brick; Bit–Slice Microprocessor Design; 1980; p. 191; McGraw–Hill.

Stallings; Chapter 9, Instruction Sets: Characteristics and Functions; Computer Organization and Architecture; 1996; pp. 313–360; Prentice Hall.

Texas Instruments SMJ320C80 Digital Signal Processor Data Sheet; Document No. SGUS025; Aug. 1998; Texas Instruments pp. 1–153.

* cited by examiner

| PERMUTE 703 | | | | | | X 531 / Y 533 | | | | PERMUTE TYPE |
|---|---|---|---|---|---|---|---|---|---|---|
| 26 | 25 | 24 | 23 | 22 | | 63 – 48 | 47 – 32 | 31 – 16 | 15 – 0 | |
| 0 | 0 | 0 | 0 | 0 | | A | B | C | D | 203A Regular Access |
| 1 | 0 | 0 | 0 | 0 | | C | D | A | B | 203B Interchange UB and LB |
| 0 | 0 | 1 | 0 | 0 | | B | A | C | D | 203C Permute HW UB |
| 0 | 0 | 0 | 0 | 1 | | A | B | D | C | 203D Permute HW LB |
| 0 | 0 | 1 | 0 | 1 | | B | A | D | C | 203E Permute HW LB+UP |
| 1 | 0 | 1 | 0 | 0 | | D | C | A | B | 203F Interchange and Permute HW UB |
| 1 | 0 | 0 | 0 | 1 | | C | D | B | A | 203G Interchange and Permute HW LB |
| 1 | 0 | 1 | 0 | 1 | | D | C | B | A | 203H Interchange and Permute HW UB+LB |
| 0 | 1 | 0 | 0 | 0 | | A | A | A | A | 203I Broadcast A bits |
| 0 | 1 | 1 | 0 | 0 | | B | B | B | B | 203J Broadcast B bits |
| 0 | 0 | 0 | 1 | 0 | | C | C | C | C | 203K Broadcast C bits |
| 0 | 0 | 0 | 1 | 1 | | D | D | D | D | 203L Broadcast D bits |
| | | | | | | to SP0 300 | to SP1 300B | to SP2 300 | to SP3 300D | |

Data Type                                              SP Configuration 1 x 4 R     | Guard (39-32) | S (31) | Data (30-28) | Zeroes (27-0) | ≈   1 x 40
                           4 Bits 1 x 8 R     | Guard (39-32) | S (31) | Data (30-24) | Zeroes (23-0) | ≈   1 x 40
                           8 Bits 1 x 16 R    | Guard (39-32) | S (31) | Data (30-16) | Zeroes (15-0) | ≈   1 x 40
                          16 Bits 1 x 32 R    | Guard (39-32) | S (31) | Data (30-0) | ≈   1 x 40
                          32 Bits 1 x 40 R    | Data (39-0) | ≈   1 x 40
                          40 Bits SXA *550* or SYA *554*

FIG. 12B

| Data Type | | SP Configuration |
|---|---|---|
| 1 x 4 R | 15 - 12 11 ─── 0 [Data | Zeroes] (4 Bits) | ≈ 1 x 16 |
| 1 x 8 R | 15 - 8 7 ─── 0 [Data | Zeroes] (8 Bits) | ≈ 1 x 16 |
| 1 x 16 R | 15 ─── 0 [Data] (16 Bits) | ≈ 1 x 16 |
| 1 x 32 R | 15 ─── 0 [Data $Hw_u(31:16)$] (16 Bits) | ≈ 1 x 16 |
| 1 x 40 R | 16 ─── 0 [Data $Hw_u(31:16)$] (16 Bits, 16 Bits) SXM 552A – 552B or SYM 556A – 556B | ≈ 1 x 16 |

SXA 550A and SXA 550B
or
SYA 554A and SYA 554B

FIG. 12D
Data Type        SP Configuration
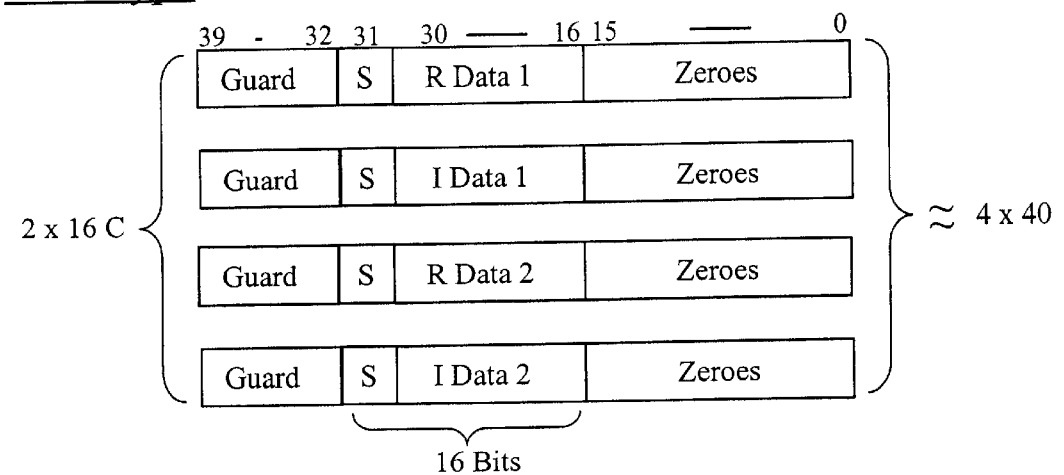
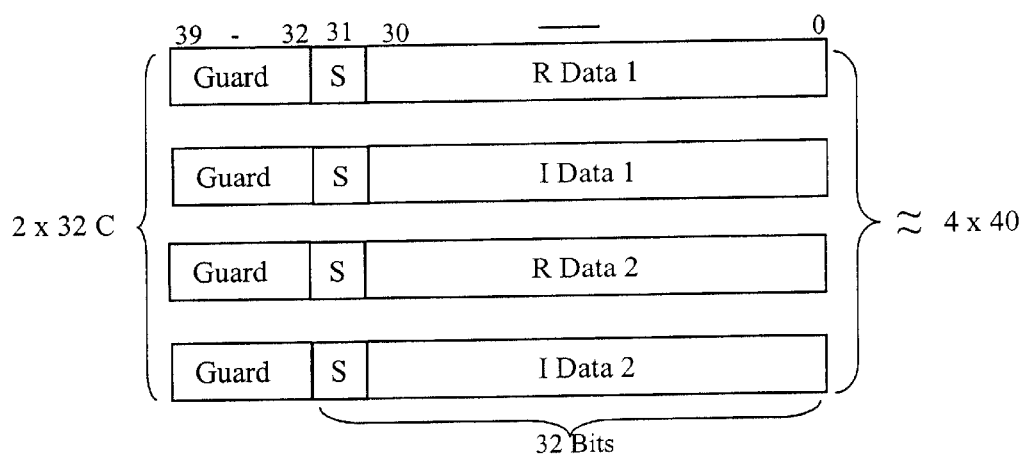
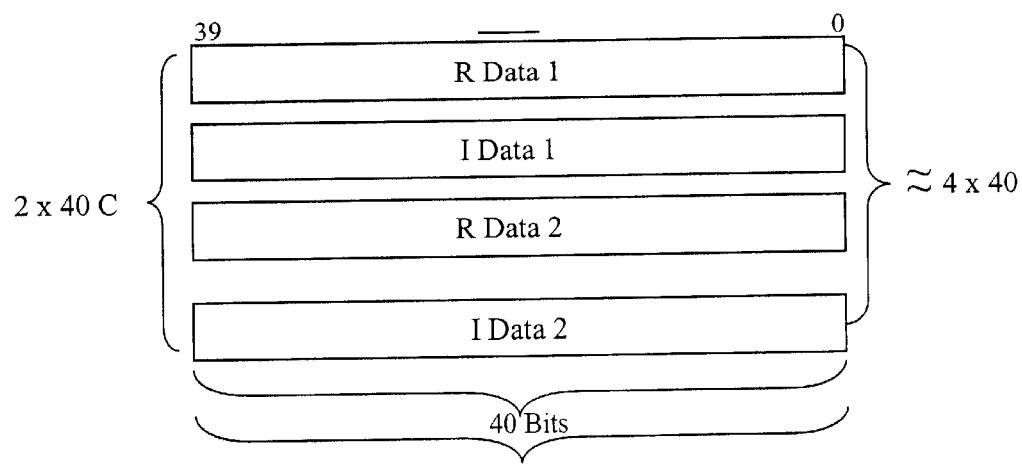
SXA *550A*, SXA *550B*, SXA *550C*, and SXA *550D*
or
SYA *554A*, SYA *554B*, SYA *554C*, and SYA *554D*

FIG. 12E

| Data Type | | SP Configuration |
|---|---|---|
| 1 x 4 C | 15 - 12  11 ——— 0  15 - 12  11 ——— 0<br>\| R Data \| Zeroes \| I Data \| Zeroes \|<br>  4 Bits         4 Bits<br>  16 Bits R       16 Bits I | ≈ 2 x 16 |
| 1 x 8 C | 15 - 8  7 ——— 0  15 - 8  7 ——— 0<br>\| R Data \| Zeroes \| I Data \| Zeroes \|<br>  8 Bits         8 Bits<br>  16 Bits R       16 Bits I | ≈ 2 x 16 |
| 1 x 16 C | 15 ——————— 0  15 ——————— 0<br>\| R Data \| I Data \|<br>  16 Bits R       16 Bits I | ≈ 2 x 16 |
| 1 x 32 C | 15 ———————— 0  15 ———————— 0<br>\| R Data $HW_U$(31:16) \| I Data $HW_U$(31:16) \|<br>  16 Bits R       16 Bits I | ≈ 2 x 16 |
| 1 x 40 C | 15 ———————— 0  15 ———————— 0<br>\| R Data $HW_U$(31:16) \| I Data $HW_U$(31:16) \|<br>  16 Bits R       16 Bits I | ≈ 2 x 16 |

SXM 552A and SXM 552B
or
SYM 556A and SYM 556B

| Operand 1 Data Type: | $N_1 \times S_1$ R |
|---|---|
| Operand 2 Data Type: | $N_2 \times S_2$ R |
| Type Matching R: | Max ($N_1$ or $N_2$) × Max ($S_1$ or $S_2$) R |

FIG. 13A

| Operand 1 Data Type: | $N_1 \times S_1$ C |
|---|---|
| Operand 2 Data Type: | $N_2 \times S_2$ C |
| Type Matching R: | Max ($N_1$ or $N_2$) × Max ($S_1$ or $S_2$) C |

FIG. 13B

| Operand 1 Data Type: | $N_1 \times S_1$ R |
|---|---|
| Operand 2 Data Type: | $N_2 \times S_2$ C |
| Type Matching R: | Max ($N_1$ or $N_2$) × Max ($S_1$ or $S_2$) C |

FIG. 13C

|         | 1x16 real | 2x16 real | 1x16 cmpx | 4x16 real | 2x16 cmpx | 1x32 real | 2x32 real | 1x32 cmpx | 4x32 real | 2x32 cmpx | 1x40 real | 2x40 real | 1x40 real | 4x40 real | 2x40 cmpx |
|---------|-----------|-----------|-----------|-----------|-----------|-----------|-----------|-----------|-----------|-----------|-----------|-----------|-----------|-----------|-----------|
| 1x16 real | 1 unit | 2 unit | 2 unit | 4 unit | 4 unit | 2 unit | 4 unit | 4 unit |  |  |  |  |  |  |  |
| 2x16 real | 2 unit | 2 unit |  |  |  |  |  |  |  |  |  |  |  |  |  |
| 1x16 cmpx | 2 unit |  | 4 unit |  |  |  |  |  |  |  |  |  |  |  |  |
| 4x16 real | 4 unit |  |  | 4 unit |  |  |  |  |  |  |  |  |  |  |  |
| 2x16 cmpx | 4 unit |  |  |  | 4 unit |  |  |  |  |  |  |  |  |  |  |
| 1x32 real | 2 unit |  |  |  |  |  |  |  |  |  |  |  |  |  |  |
| 2x32 real | 4 unit |  |  |  |  |  |  |  |  |  |  |  |  |  |  |
| 1x32 cmpx | 4 unit |  |  |  |  |  |  |  |  |  |  |  |  |  |  |
| 4x32 real |  |  |  |  |  |  |  |  |  |  |  |  |  |  |  |
| 2x32 cmpx |  |  |  |  |  |  |  |  |  |  |  |  |  |  |  |
| 1x40 real |  |  |  |  |  |  |  |  |  |  |  |  |  |  |  |
| 2x40 real |  |  |  |  |  |  |  |  |  |  |  |  |  |  |  |
| 1x40 real |  |  |  |  |  |  |  |  |  |  |  |  |  |  |  |
| 4x40 real |  |  |  |  |  |  |  |  |  |  |  |  |  |  |  |
| 2x40 real |  |  |  |  |  |  |  |  |  |  |  |  |  |  |  |

*FIG. 14*

| | 1x16 real | 2x16 real | 1x16 cmpx | 4x16 real | 2x16 cmpx | 1x32 real | 2x32 real | 1x32 cmpx | 4x32 real | 2x32 cmpx | 1x40 real | 2x40 real | 1x40 cmpx | 4x40 real | 2x40 cmpx |
|---|---|---|---|---|---|---|---|---|---|---|---|---|---|---|---|
| 1x16 real | 1 unit | 2 unit | | | | 1 unit | | | | | 1 unit | | | | |
| 2x16 real | 2 unit | 2 unit | | | | 2 unit | 2 unit | | | | | 2 unit | | | |
| 1x16 cmpx | | | | | | | | | | | | | | | |
| 4x16 real | 4 unit | | | 4 unit | | 4 unit | | | 4 unit | | | | | 4 unit | |
| 2x16 cmpx | | | | | | | | | | | | | | | |
| 1x32 real | 1 unit | 2 unit | | 4 unit | | 1 unit | 2 unit | | 4 unit | | 1 unit | 2 unit | | 4 unit | |
| 2x32 real | 4 unit | 2 unit | | | | 2 unit | 2 unit | | | | | 2 unit | | | |
| 1x32 cmpx | | | | | | | | | | | | | | | |
| 4x32 real | 4 unit | | | 4 unit | | 4 unit | | | 4 unit | | 4 unit | | | 4 unit | |
| 2x32 cmpx | | | | | | | | | | | | | | | |
| 1x40 real | 1 unit | | | 4 unit | | 1 unit | | | 4 unit | | 1 unit | | | 4 unit | |
| 2x40 real | 2 unit | | | | | 2 unit | 2 unit | | | | | 2 unit | | | |
| 1x40 cmpx | | | 4 unit | | | | | | | | | | | | |
| 4x40 real | 4 unit | | | | | 4 unit | | | | | | | | 4 unit | |
| 2x40 real | | | | | | | | | | | | | | | |

| | 1x16 real | 2x16 real | 1x16 cmpx | 4x16 real | 2x16 cmpx | 1x32 real | 2x32 real | 1x32 cmpx | 4x32 real | 2x32 cmpx | 1x40 real | 2x40 real | 1x40 real | 4x40 real | 2x40 cmpx |
|---|---|---|---|---|---|---|---|---|---|---|---|---|---|---|---|
| 1x16 real | 1 unit | | | | | | | | | | | | | | |
| 2x16 real | 2 unit | 2 unit | | | | | | | | | | | | | |
| 1x16 cmpx | 2 unit | | 2 unit | | | | | | | | | | | | |
| 4x16 real | 4 unit | | | 1 unit | | | | | | | | | | | |
| 2x16 cmpx | 4 unit | | | | 4 unit | | | | | | | | | | |
| 1x32 real | 1 unit | 2 unit | | | | 1 unit | | | | | | | | | |
| 2x32 real | 2 unit | 2 unit | | | | 2 unit | 2 unit | | | | | | | | |
| 1x32 cmpx | 2 unit | | 2 unit | | | 2 unit | | 2 unit | | | | | | | |
| 4x32 real | 4 unit | | | 4 unit | | 4 unit | | | 4 unit | | | | | | |
| 2x32 cmpx | 4 unit | | | | 4 unit | 4 unit | | | | 4 unit | | | | | |
| 1x40 real | 1 unit | 2 unit | | | | 1 unit | 2 unit | 2 unit | | | 1 unit | | | | |
| 2x40 real | 2 unit | 2 unit | | | | 2 unit | 2 unit | 2 unit | | | 2 unit | 2 unit | | | |
| 1x40 real | 2 unit | | 2 unit | | | 2 unit | | 2 unit | | | 4 unit | | 2 unit | | |
| 4x40 real | 4 unit | | | 4 unit | | 4 unit | | | 4 unit | | 1 unit | 2 unit | | 4 unit | |
| 2x40 real | 4 unit | | | | 4 unit | | | | | 4 unit | | 2 unit | 2 unit | | 4 unit |

PROCESSORS WITH DATA TYPER AND ALIGNER SELECTIVELY COUPLING DATA BITS OF DATA BUSES TO ADDER AND MULTIPLIER FUNCTIONAL BLOCKS TO EXECUTE INSTRUCTIONS WITH FLEXIBLE DATA TYPES

CROSS REFERENCE TO RELATED APPLICATIONS

This application is a continuation-in-part application and claims the benefit of U.S. application Ser. No. 09/427,174, filed Oct. 25, 1999 by inventors Ganapathy et al, now issued U.S. Pat. No. 6,330,660, the disclosure of which prior application is hereby incorporated by reference, verbatim and with the same effect as though it were fully and completely set forth herein, both of which are to be assigned to Vxtel, Inc.

This application is also a continuation-in-part application and claims the benefit of U.S. application Ser. No. 09/494,608, filed Jan. 31, 2000 by inventors Ganapathy et al, now issued U.S. Pat. No. 6,446,145, the disclosure of which prior application is hereby incorporated by reference, verbatim and with the same effect as though it were fully and completely set forth herein, both of which are to be assigned to Vxtel, Inc.

FIELD OF THE INVENTION

This invention relates generally to the instruction set architectures (ISA) of processors. More particularly, the invention relates to operand data types for digital signal processors.

BACKGROUND OF THE INVENTION

To process data in a computing device, an instruction set is defined. An instruction set having one or more instructions are required for computing devices such as microprocessors, computers or single chip DSP devices. In defining an instruction set for a computing device, the data type of operands that will be computed is usually predefined based on the number representation to be utilized and the type of hardware that is provided. The data type of the instruction set architecture (ISA) in essence is defined by how and what type of numeric data the computing device will process.

The number representation utilized for data types includes the radix or base of a number, whether or not it is to be encoded (binary coded such as BCD), and the numeric format. The radices ordinarily used in computers is binary or a radix of two. Other radices that may be used in computers is octal (radix of eight), decimal (radix of ten), and hexadecimal (radix of sixteen). If a radix other than two is selected, it ordinarily needs to be binarily coded so that it is recognizable by digital logic. For example, if a radix of ten is used the numbers are binary coded using a four bit binary number which is referred to as binary coded decimal (BCD).

The numeric format is associated with whether the number is to have a fixed point or floating point representation, an integer or fractional format and their associated representations, a normalized or unnormalized format, and whether the bits representing the number are packed or unpacked. In a floating point representation an exponent number is usually included. In a fixed point representation, the radix point (decimal point for radix of ten) is in a fixed position with respect to the bits or numbers of the data. If the radix point is to the right of all numbers it is an integer format. If the radix point is to the left of all numbers it is a fractional format. An example of floating point data types is the single and double precision floating point data types defined in the IEEE 754 specification.

The normalized and unnormalized formats are specific to floating point representations and a fractional format. If a number is to be normalized, the number is to be represented in fractional form and the bit to the immediate right of the radix point is a one. If it is an unnormalized format, the number is to be represented in fractional form and the bit to the immediate right of the radix point can be either a one or a zero.

If the numbers which are to be processed can be positive or negative, the numeric representation needs to have an encoding scheme to provide the representation of both positive and negative values. Typical encoding methods for integer formats are sign-magnitude, diminished-radix complement (one's complement for binary or a radix of two) and radix complement (two's complement for binary or a radix of two). If a floating format is used, both the fraction value and the exponent value may be encoded similar to the integer encoding methods. Furthermore depending upon the range of values and/or accuracy desired, the number of bits (i.e. digits), bytes and words for the numeric representation needs to be considered. For example, the number of bits representing a number may be fixed to one thirty two bit value or four eight bit bytes. As another example, the number of bits representing a number may be thirty two bits for the fractional format and three bits for the exponent.

Additionally, besides a numeric representation, the data type of an instruction set architecture may include character strings or text type of data. The characters in this case are usually encoded into a binary form such as the American Standard Code for Information Interchange (ASCII) code. Another form of encoding is Extended Binary Coded Decimal Interchange Code (EBCDIC). These encoded forms may also be packed from their binary forms into a packed decimal form in order to reduce the number of bits necessary for their representation.

The data type for an instruction set architecture of a digital signal processor (DSP) is important. DSPs generally are distinguished from general purpose microprocessors in that DSPs typically support accelerated arithmetic operations by including a dedicated multiplier and accumulator (MAC) for performing multiplication of digital numbers. The instruction set for a typical DSP device usually includes only one DSP instruction, a MAC instruction, for performing multiplication of new operands and addition with a prior accumulated value stored within an accumulator register. The data type for the operands of the MAC instruction in prior art DSP devices is usually dependent upon the multiplier hardware performing its portion of the MAC operation. Typically the data type is fixed for the DSP. If it is desirable to perform a MAC operation on operands of data having a format that does not conform to the data type, other instructions need be executed to format the data so that it can be processed by the given MAC instruction with the given data type. These other instructions may included reading and writing data into a memory in order to select the appropriate bits of data of the operand upon which to perform the MAC instruction.

One area where DSPs may be utilized is in telecommunication systems. One use of DSPs in telecommunication systems is digital filtering. In this case a DSP is typically programmed with instructions to implement some filter function in the digital or time domain. The mathematical algorithm for a typical finite impulse response (FIR) filter may look like the equation $Y_n = h_0X_0 + h_1X_1 + h_2X_2 + \ldots + h_NX_N$ where $h_n$ are fixed filter coefficients numbering from 1 to N and $X_n$ are the data samples. The equation $Y_n$ may be evaluated by using a software program. However in some applications, it is necessary that the equation be evaluated as fast as possible. One way to do this is to perform the computations using hardware components such as a DSP device programmed to compute the equation $Y_n$. In order to further speed the process, it is desirable to vectorize the equation and distribute the computation amongst multiple DSPs such that the final result is obtained more quickly. The multiple DSPs operate in parallel to speed the computation process. In this case, the multiplication of terms is spread across the multipliers of the DSPs equally for simultaneous computations of terms. The adding of terms is similarly spread equally across the adders of the DSPs for simultaneous computations. In vectorized processing, the order of processing terms is unimportant since the combination is associative. If the processing order of the terms is altered, it has no effect on the final result expected in a vectorized processing of a function. In a DSP device that is used to perform vectorized processing, it is desirable to consider the type of vectorized processing within the data type of the instruction set architecture to improve data processing efficiency.

Oftentimes the type of filtering used in communication systems differs. The different types of filtering systems may use differing types of operands and filter coefficients. In these cases it is desirable to have flexibility in how DSP instructions process differing operands. It is also desirable to improve the efficiency of using computing resources to speed the execution of DSP instructions.

BRIEF SUMMARY OF THE INVENTION

The present invention is briefly summarized in the claims and includes a method, an apparatus and a system as described therein.

BRIEF DESCRIPTIONS OF THE DRAWINGS

FIG. 9 is an exemplary chart of possible permutations of operands and their respective orientation to the signal processing units.

FIG. 12A is a chart of real data types and their alignment for the adders of the signal processing units.

FIG. 12B is a chart of real data types and their alignment for the multipliers of the signal processing units.

FIG. 12D is a second chart of complex data types and their alignment for the adders of the signal processing units.

FIG. 12E is a chart of complex data types and their alignment for the multipliers of the signal processing units.

FIG. 13A is a chart illustrating data type matching for a real pair of operands.

FIG. 13B is a chart illustrating data type matching for a complex pair of operands.

FIG. 13C is a chart illustrating data type matching for a real operand and a complex operand.

FIG. 14 is an exemplary chart illustrating data type matching for the multipliers of the signal processing units.

FIG. 15A is an exemplary chart illustrating data type matching for the adders of the signal processing units for scalar addition.

FIG. 15B is an exemplary chart illustrating data type matching for the adders of the signal processing units for vector addition.

Like reference numbers and designations in the drawings indicate like elements providing similar functionality. A letter after a reference designator number represents an instance of an element having the reference designator number.

DETAILED DESCRIPTION OF THE PREFERRED EMBODIMENT

Figure 1A:
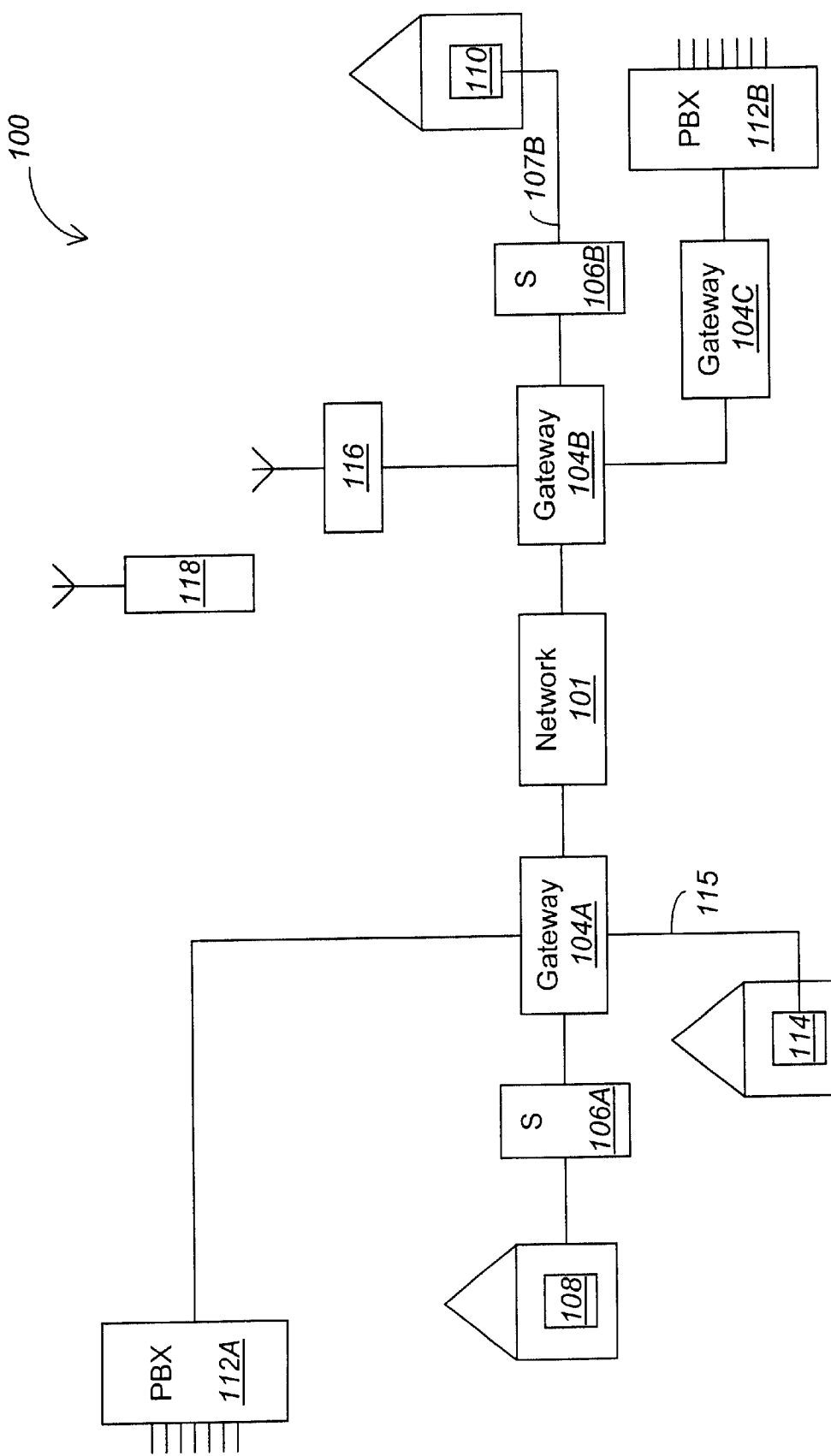
FIG. 1A is a block diagram of a system utilizing the present invention.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention. Furthermore, the present invention will be described in particular embodiments but may be implemented in hardware, software, firmware or a combination thereof Multiple application specific signal processors (ASSPs) having the instruction set architecture of the present invention include flexible data typing, permutation, and type matching of operands. The flexible data typing, permutation and type matching of operands provides programming flexibility to support different filtering and DSP algorithms having different types of filter coefficients or data samples. The flexibility to support different DSP algorithms within gateways of communication systems can provide improved voice and data communication over a packetized network. Each ASSP includes a serial interface, a buffer memory and four core processors in order to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay, or other packetized network. The four signal processing units can execute digital signal processing algorithms in parallel. Each ASSP is flexible and can be programmed to perform many network functions or data/voice processing functions, including voice and data compression/decompression in telecommunication systems (such as CODECs), particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the present invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units 300. The RISC ISA is a register based architecture including 16-registers within the register file 413, while the DSP ISA is a memory based architecture with efficient digital signal processing instructions. The instruction word for the ASSP is typically 20 bits but can be expanded to 40-bits to control two instructions to the executed in series or parallel, such as two RISC control instruction and extended DSP instructions. The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor of the type where D=[(A op1 B) op2 C] and each of "op1" and "op2" can be a multiply, add or extremum (min/max) class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two DSP instructions or operations in one instruction and includes a main DSP operation (MAIN OP) and a sub DSP operation (SUB OP). Generally, the instruction set architecture of the present invention can be generalized to combining any pair of basic DSP operations to provide very powerful dyadic instruction combinations. The DSP arithmetic operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The present invention efficiently executes these dyadic DSP instructions by means of the instruction set architecture and the hardware architecture of the application specific signal processor.

Referring now to FIG. 1A, a voice and data communication system 100 is illustrated. The system 100 includes a network 101 which is a packetized or packet-switched network, such as IP, ATM, or frame relay. The network 101 allows the communication of voice/speech and data between endpoints in the system 100, using packets. Data may be of any type including audio, video, email, and other generic forms of data. At each end of the system 100, the voice or data requires packetization when transceived across the network 101. The system 100 includes gateways 104A, 104B, and 104C in order to packetize the information received for transmission across the network 101. A gateway is a device for connecting multiple networks and devices that use different protocols. Voice and data information may be provided to a gateway 104 from a number of different sources in a variety of digital formats. In system 100, analog voice signals are transceived by a telephone 108. In system 100, digital voice signals are transceived at public branch exchanges (PBX) 112A and 112B which are coupled to multiple telephones, fax machines, or data modems. Digital voice signals are transceived between PBX 112A and PBX 112B with gateways 104A and 104C, respectively. Digital data signals may also be transceived directly between a digital modem 114 and a gateway 104A. Digital modem 114 may be a Digital Subscriber Line (DSL) modem or a cable modem. Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B. Data may be transceived by means of modem signals over the plain old telephone system (POTS) 107B using a modem 110. Modem signals communicated over POTS 107B are traditionally analog in nature and are coupled into a switch 106B of the public switched telephone network (PSTN). At the switch 106B, analog signals from the POTS 107B are digitized and transceived to the gateway 104B by time division multiplexing (TDM) with each time slot representing a channel and one DS0 input to gateway 104B. At each of the gateways 104A, 104B and 104C, incoming signals are packetized for transmission across the network 101. Signals received by the gateways 104A, 104B and 104C from the network 101 are depacketized and transcoded for distribution to the appropriate destination.

Figure 1B:
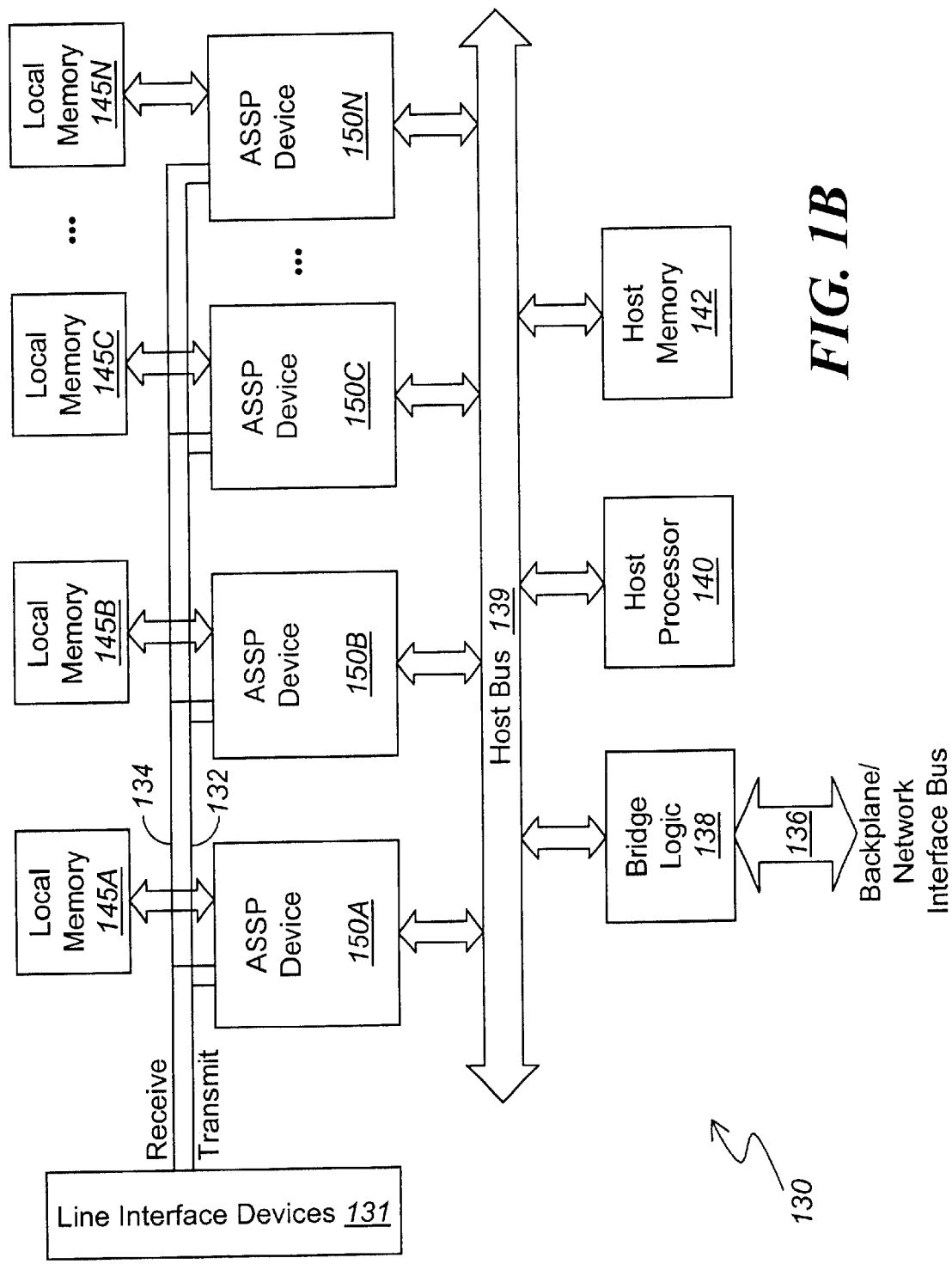
FIG. 1B is a block diagram of a printed circuit board utilizing the present invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Line interface devices 131 of NIC 130 provide interfaces to various devices connected to the gateway, including the network 101. In interfacing to the network 101, the line interface devices packetize data for transmission out on the network 101 and depacketize data which is to be received by the ASSP devices. Line interface devices 131 process information received by the gateway on the receive bus 134 and provides it to the ASSP devices. Information from the ASSP devices 150 is communicated on the transmit bus 132 for transmission out of the gateway. A traditional line interface device is a multi-channel serial interface or a UTOPIA device. The NIC 130 couples to a gateway backplane/network interface bus 136 within the gateway 104. Bridge logic 138 transceives information between bus 136 and NIC 130. Bridge logic 138 transceives signals between the NIC 130 and the backplane/network interface bus 136 onto the host bus 139 for communication to either one or more of the ASSP devices 150A–150N, a host processor 140, or a host memory 142. Optionally coupled to each of the one or more ASSP devices 150A through 150N (generally referred to as ASSP 150) are optional local memory 145A through 145N (generally referred to as optional local memory 145), respectively. Digital data on the receive bus 134 and transmit bus 132 is preferably communicated in bit wide fashion. While internal memory within each ASSP may be sufficiently large to be used as a scratchpad memory, optional local memory 145 may be used by each of the ASSPs 150 if additional memory space is necessary.

Each of the ASSPs 150 provide signal processing capability for the gateway. The type of signal processing provided is flexible because each ASSP may execute differing signal processing programs. Typical signal processing and related voice packetization functions for an ASSP include (a) echo cancellation; (b) video, audio, and voice/speech compression/decompression (voice/speech coding and decoding); (c) delay handling (packets, frames); (d) loss handling; (e) connectivity (LAN and WAN); (f) security (encryption/decryption); (g) telephone connectivity; (h) protocol processing (reservation and transport protocols, RSVP, TCP/IP, RTP, UDP for IP, and AAL2, AAL1, AAL5 for ATM); (i) filtering; (j) Silence suppression; (k) length handling (frames, packets); and other digital signal processing functions associated with the communication of voice and data over a communication system. Each ASSP 150 can perform other functions in order to transmit voice and data to the various endpoints of the system 100 within a packet data stream over a packetized network.

Figure 2:
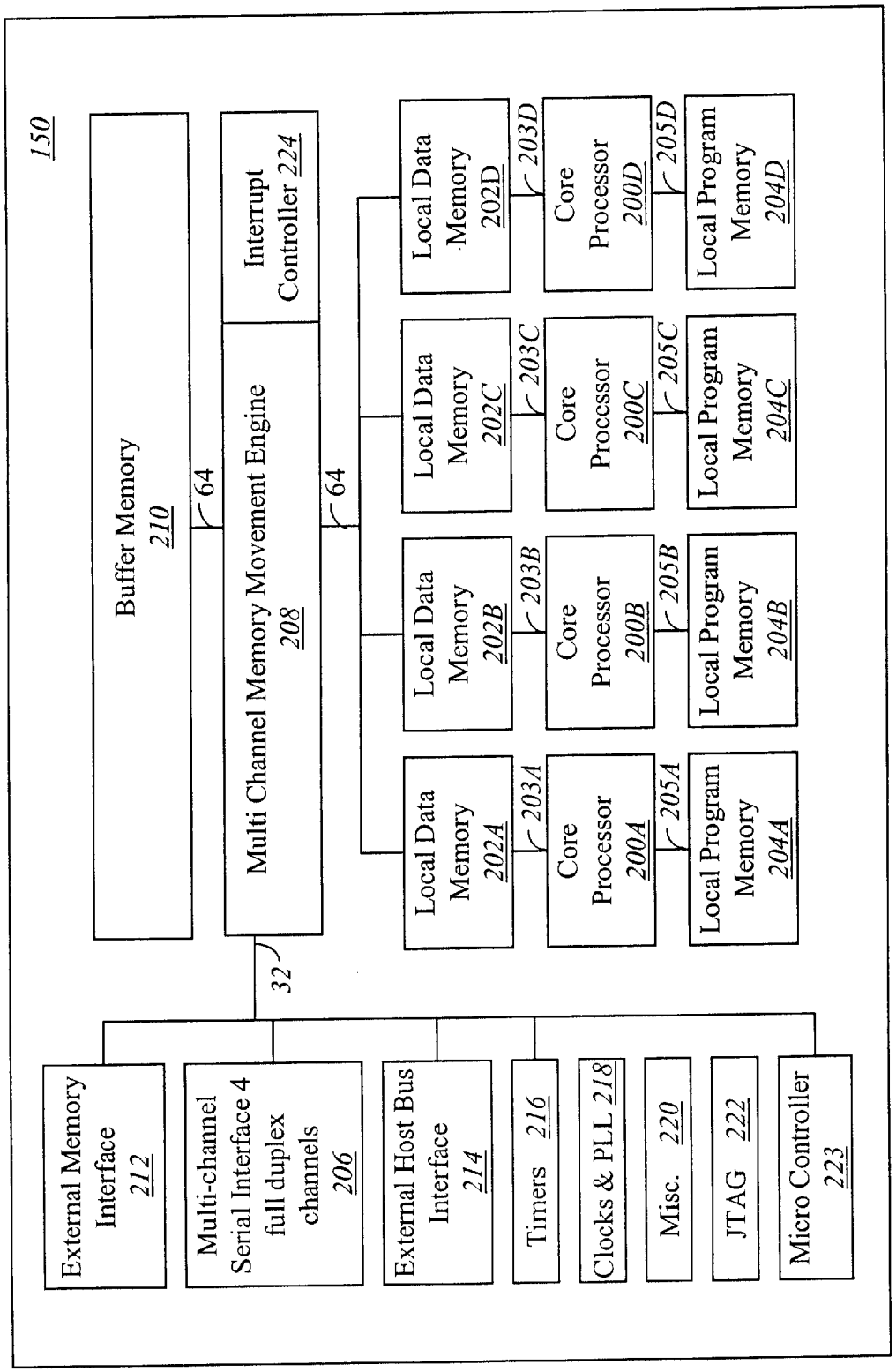
FIG. 2 is a block diagram of the Application Specific Signal Processor (ASSP) of the present invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D through buses 203A–203D. Each of the core processors 200A–200D is also respectively coupled to a program memory 204A–204D through buses 205A–205D respectively. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to the external optional local memory 145. The ASSP 150 includes an external host interface 214 for interfacing to the external host processor 140 of FIG. 1B. Further included within the ASSP 150 are timers 216, clock generators and a phase-lock loop 218, miscellaneous control logic 220, and a Joint Test Action Group (JTAG) test access port 222 for boundary scan testing. The multi-channel serial interface 206 may be replaced with a UTOPIA parallel interface for some applications such as ATM. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Figure 3:
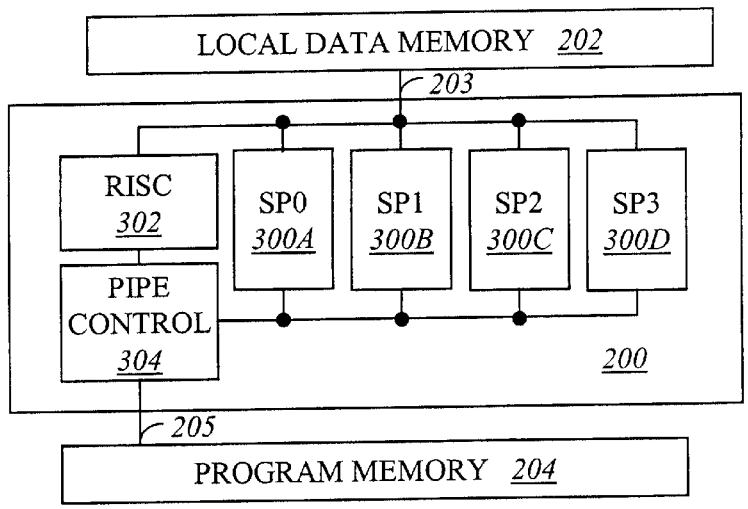
FIG. 3 is a block diagram of an instance of the core processors within the ASSP of the present invention.

Referring now to FIG. 3, a block diagram of the core processor 200 is illustrated coupled to its respective data memory 202 through buses 203 and program memory 204 through buses 205. Core processor 200 is the block diagram for each of the core processors 200A–200D. Data memory 202 and program memory 204 refers to a respective instance of data memory 202A–202D and program memory 204A–204D, respectively. Buses 203 and 205 refers to a respective instance of buses 203A–203D and 205A–205D, respectively. The core processor 200 includes four signal processing units SP0 300A, SP1 300B, SP2 300C and SP3 300D. The core processor 200 further includes a reduced instruction set computer (RISC) control unit 302 and a pipeline control unit 304.

The signal processing units 300A–300D perform the signal processing tasks on data while the RISC control unit 302 and the pipeline control unit 304 perform control tasks related to the signal processing function performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level.

Program memory 204 couples to the pipe control 304 which includes an instruction buffer that acts as a local loop cache. The instruction buffer in the preferred embodiment has the capability of holding four instructions. The instruction buffer of the pipe control 304 reduces the power consumed in accessing the main memories to fetch instructions during the execution of program loops.

The signal processing tasks are performed on the datapaths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory, resulting in very efficient data processing. Thus, the instruction set architecture of the present invention having a 20 bit instruction word, which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Figure 4:
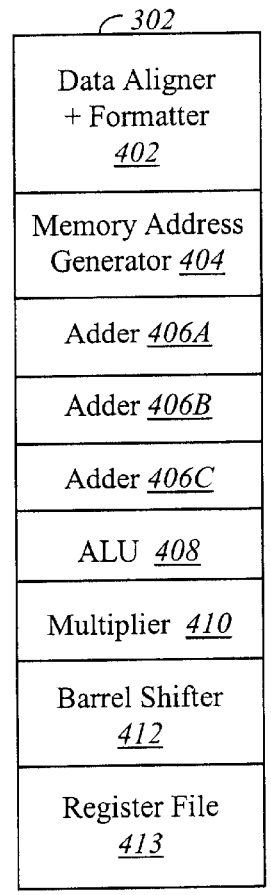
FIG. 4 is a block diagram of the RISC processing unit within the core processors of FIG. 3.

Referring now to FIG. 4, a detailed block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202. The RISC control unit 302 is responsible for supplying addresses to data memory so that the proper data stream is fed to the signal processing units 300A–300D. The RISC control unit 302 is a register to register organization with load and store instructions to move data to and from data memory 202. Data memory addressing is performed by RISC control unit using a 32-bit register as a pointer that specifies the address, post-modification offset, and type and permute fields. The type field allows a variety of natural DSP data to be supported as a "first class citizen" in the architecture. For instance, the complex type allows direct operations on complex data stored in memory removing a number of bookkeeping instructions. This is useful in supporting QAM demodulators in data modems very efficiently.

Figure 5A:
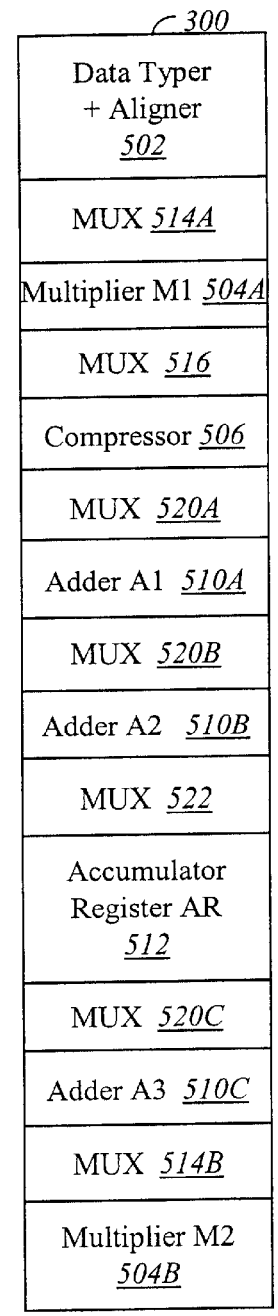
FIG. 5A is a block diagram of an instance of the signal processing units within the core processors of FIG. 3.

Referring now to FIG. 5A, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504B. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers. In the preferred embodiment, multiplier M1 504A, compressor 506, adder A1 510A, adder A2 510B and accumulator 512 can receive inputs directly from external data buses through the data typer and aligner 502. In the preferred embodiment, adder 510C and multiplier M2 504B receive inputs from the accumulator 512 or the outputs from the execution units multiplier M1 504A, compressor 506, adder A1 510A, and adder A2 510B.

Figure 5B:
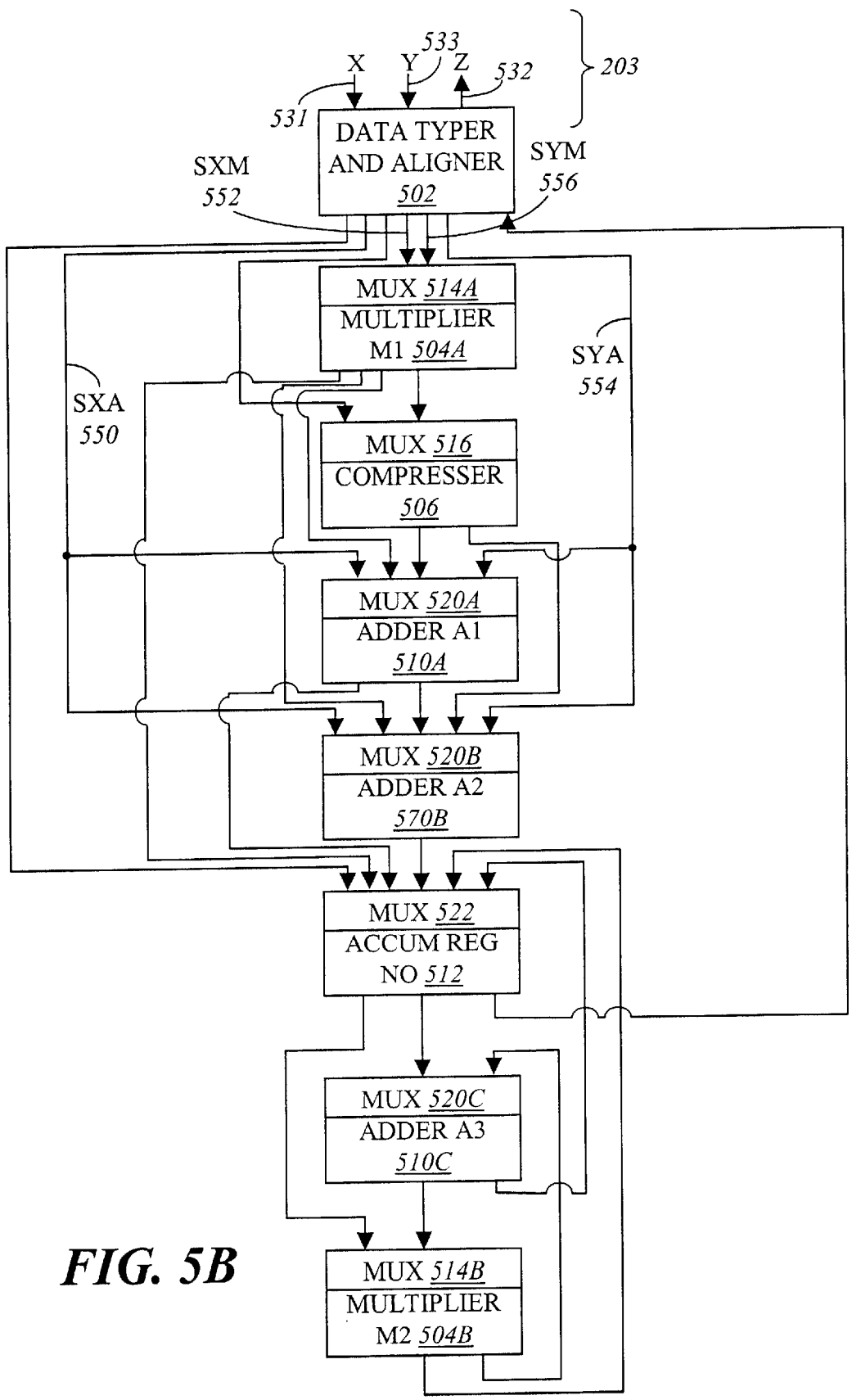
FIG. 5B is a more detailed block diagram of FIG. 5A illustrating the bus structure of the signal processing unit.

Referring now to FIG. 5B, a more detailed block diagram of the functional blocks and the bus structure of the signal processing unit 300 is illustrated. Flexible data typing is possible because of the structure and functionality provided in each signal processing unit. The buses 203 to data memory 202 include a Z output bus 532 and an X input bus 531 and a Y input bus 533. Output signals are coupled out of the signal processor 300 on the Z output bus 532 through the data typer and aligner 502. Input signals are coupled into the signal processor 300 on the X input bus 531 and Y input bus 533 through the data typer and aligner 502. Two operands can be loaded in parallel together from the data memory 202 into the signal processor 300, one on each of the X bus 531 and the Y bus 533.

Internal to the signal processor 300, the SXM bus 552 and the SYM bus 556 couple between the data typer and aligner 502 and the multiplier M1 504A for two sources of operands from the X bus 531 and the Y bus 533 respectively. The SXA bus 550 and the SYA bus 554 couple between the data typer and aligner 502 and the adder A1 510A and between the data typer and aligner 502 and the adder A2 510B for two sources of operands from the X bus 531 and the Y bus 533 respectively. In the preferred embodiment, the X bus 531 and the Y bus 533 is sixty four bits wide while the SXA bus 550 and the SYA bus 554 is forty bits wide and the SXM bus 552 and the SYM bus 556 is sixteen bits wide. Another pair of internal buses couples between the data typer and aligner 502 and the compressor 506 and between the data typer and aligner 502 and the accumulator register AR 512. While the data typer and aligner 502 could have data busses coupling to the adder A3 510C and the multiplier M2 504B, in the preferred embodiment it does not in order to avoid extra data lines and conserve area usage of an integrated circuit.

Output data is coupled from the accumulator register AR 512 into the data typer and aligner 502 over yet another bus. Multiplier M1 504A has buses to couple its output into the inputs of the compressor 506, adder A1 510A, adder A2 510B, and the accumulator registers AR 512. Compressor 506 has buses to couple its output into the inputs of adder A1 510A and adder A2 510B. Adder A1 510A has a bus to couple its output into the accumulator registers 512. Adder A2 510B has buses to couple its output into the accumulator registers 512. Accumulator registers 512 has buses to couple its output into multiplier M2 504B, adder A3 510C, and data typer and aligner 502. Adder A3 510C has buses to couple its output into the multiplier M2 504B and the accumulator registers 512. Multiplier M2 504B has buses to couple its output into the inputs of the adder A3 510C and the accumulator registers AR 512.

INSTRUCTION SET ARCHITECTURE

The instruction set architecture of the ASSP 150 is tailored to digital signal processing applications including audio and speech processing such as compression/decompression and echo cancellation. In essence, the instruction set architecture implemented with the ASSP 150, is adapted to DSP algorithmic structures. The adaptation of the ISA of the present invention to DSP algorithmic structures is a balance between ease of implementation, processing efficiency, and programmability of DSP algorithms. The ISA of the present invention provides for data movement operations, DSP/arithmetic/logical operations, program control operations (such as function calls/returns, unconditional/conditional jumps and branches), and system operations (such as privilege, interrupt/trap/hazard handling and memory management control).

The instruction set architecture of the ASSP 150 can be viewed as being two component parts, one (RISC ISA) corresponding to the RISC control unit and another (DSP ISA) to the DSP datapaths of the signal processing units 300. The RISC ISA is a register based architecture including sixteen registers within the register file 413, while the DSP ISA is a memory based architecture with efficient digital signal processing instructions. The instruction word for the ASSP is typically 20 bits but can be expanded to 40-bits to control two RISC or DSP instructions to be executed in series or parallel, such as a RISC control instruction executed in parallel with a DSP instruction, or a 40 bit extended RISC or DSP instruction.

The instruction set architecture of the ASSP 150 has 4 distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor 200 of the type where D=[ (A op1 B) op2 C] and each of "op1" and "op2" can be a multiply, add or extremum (min/max) class of operation on the three operands A, B, and C. The ISA of the ASSP 150 which accelerates these calculations allows efficient chaining of different combinations of operations. These type of operations require three operands, which need to be made available to the processor which is to perform the operation. The size of the integrated circuit places limits on the bus structure which limits the bandwidth to two vector reads and one vector write each cycle into and out of data memory 202. Thus one of the three operands, such as B or C, needs to come from another source within the core processor 200. The third operand can be placed into one of the registers of the accumulator 512 or the RISC register file 413. In order to accomplish this within the core processor 200 there are two subclasses of the 20-bit DSP instructions which are (1) A and B specified by a 4-bit specifier, and C and D by a 1-bit specifier and (2) A and C specified by a 4-bit specifier, and B and D by a 1 bit specifier.

Instructions for the ASSP are always fetched 40-bits at a time from program memory with bit 39 and 19 indicating the type of instruction. After fetching, the instruction is grouped into two sections of 20 bits each for execution of operations. In the case of 20-bit control instructions with parallel execution (bit 39=0, bit 19=0), the two 20-bit sections are control instructions that are executed simultaneously. In the case of 20-bit control instructions for serial execution (bit 39=0, bit 19=1), the two 20-bit sections are control instructions that are executed serially. In the case of 20-bit DSP instructions for serial execution (bit 39=1, bit 19=1), the two 20-bit sections are DSP instructions that are executed serially. In the case of 40-bit DSP instructions (bit 39=1, bit 19=0), the two 20 bit sections form one extended DSP instruction which are executed simultaneously.

The ISA of the ASSP 150 is fully predicated providing for execution prediction. Within the 20-bit RISC control instruction word and the 40-bit extended DSP instruction word there are 2 bits of each instruction specifying one of four predicate registers within the RISC control unit 302. Depending upon the condition of the predicate register, instruction execution can conditionally change base on its contents.

In order to access operands within the data memory 202 or registers within the accumulator 512 or register file 413, a 6-bit specifier is used in the DSP extended instructions to access operands in memory and registers. Of the six bit specifier used in the extended DSP instructions, the MSB (Bit 5) indicates whether the access is a memory access or register access. In the preferred embodiment, if Bit 5 is set to logical one, it denotes a memory access for an operand. If Bit 5 is set to a logical zero, it denotes a register access for an operand. If Bit 5 is set to 1, the contents of a specified register (rX where X: 0–7) are used to obtain the effective memory address and post-modify the pointer field by one of two possible offsets specified in one of the specified rX registers. If Bit 5 is set to 0, Bit 4 determines what register set has the contents of the desired operand. If Bit-4 is set to 0, then the remaining specified bits 3:0 control access to the registers within the register file 413 or to registers within the signal processing units 300.

DSP INSTRUCTIONS

There are four major classes of DSP instructions for the ASSP 150 these are :

1) Multiply (MULT): Controls the execution of the main multiplier connected to data buses from memory.
   Controls: Rounding, sign of multiply
   Operates on vector data specified through type field in address register
   Second operation: Add, Sub, Min, Max in vector or scalar mode
2) Add (ADD): Controls the execution of the main-adder
   Controls: absolute value control of the inputs, limiting the result
   Second operation: Add, add-sub, mult, mac, min, max
3) Extremum (MIN/MAX): Controls the execution of the main-adder
   Controls: absolute value control of the inputs, Global or running max/min with T register, TR register recording control
   Second operation: add, sub, mult, mac, min, max
4) Misc: type-match and permute operations.

The ASSP 150 can execute these DSP arithmetic operations in vector or scalar fashion. In scalar execution, a reduction or combining operation is performed on the vector results to yield a scalar result. It is common in DSP applications to perform scalar operations, which are efficiently performed by the ASSP 150.

The 20-bit DSP instruction words have 4-bit operand specifiers that can directly access data memory using 8 address registers (r0–r7) within the register file 413 of the RISC control unit 302. The method of addressing by the 20 bit DSP instruction word is regular indirect with the address register specifying the pointer into memory, post-modification value, type of data accessed and permutation of the data needed to execute the algorithm efficiently. All of the DSP instructions control the multipliers 504A–504B, adders 510A–510C, compressor 506 and the accumulator 512, the functional units of each signal processing unit 300A–300D.

In the 40 bit instruction word, the type of extension from the 20 bit instruction word falls into five categories:
1) Control and Specifier extensions that override the control bits in mode registers
2) Type extensions that override the type specifier in address registers
3) Permute extensions that override the permute specifier for vector data in address registers
4) Offset extensions that can replace or extend the offsets specified in the address registers
5) DSP extensions that control the lower rows of functional units within a signal processing unit 300 to accelerate block processing.

The 40-bit control instructions with the 20 bit extensions further allow a large immediate value (16 to 20 bits) to be specified in the instruction and powerful bit manipulation instructions.

Efficient DSP execution is provided with 3×20-bit DSP instructions with the first 20-bits controlling the top functional units (adders 501A and 510B, multiplier 504A, compressor 506) that interface to data buses from memory and the second 20 bits controlling the bottom functional units (adder 510C and multiplier 504B) that use internal or local data as operands.

Efficient DSP execution is also improved by the hardware architecture of the present invention. In this case, efficiency is improved in the manner that data is supplied to and from data memory 202 to feed the four signal processing units 300 and the DSP functional units therein. The data highway is comprised of buses 203 including the X bus 531 and Y bus 533 for X and Y source operands respectively and the Z bus 532 for a result write. All buses, including X bus 531, Y bus 533, and Z bus 532, are preferably 64 bits wide. The buses are uni-directional to simplify the physical design and reduce transit times of data. In the preferred embodiment when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

DATA TYPING, ALIGNING AND PERMUTING

In order for the present invention to adapt to the different DSP algorithmic structures, it provides for flexible data typing and aligning, data type matching, and permutation of operands. Different DSP algorithms may use data samples having varying bit widths such as four bits, eight bits, sixteen bits, twenty four bits, thirty two bits, or forty bits. Additionally, the data samples may be real or complex. In the preferred embodiment of the present invention, the multipliers in the signal processing units are sixteen bits wide and the adders in the signal processing units are forty bits wide. The operands are read into the signal processing units from data memory across the X or Y data bus each of which in the preferred embodiment are sixty four bits wide. The choice of these bit widths considers the type of DSP algorithms being processed, the operands/data samples, the physical bus widths within an integrated circuit, and the circuit area required to implement the adders and multipliers. In order to flexibly handle the various data types, the operands are automatically adapted (i.e. aligned) by the present invention to the adder or multiplier respectively. If the data type of the operands differs, than a type matching is required. The present invention provides automatic type matching to process disparate operands. Furthermore, various permutations of the operands may be desirable such as for scaling a vector by a constant. In which case, the present invention provides flexible permutations of operands.

Figures 6, 7, 8:
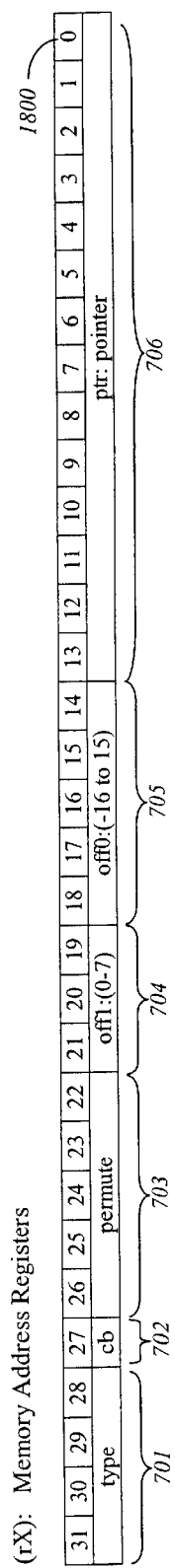
FIG. 6 is the general data type format for an operand of the instruction set architecture of the present invention.
FIG. 7 is an exemplary bitmap for a control register illustrating data typing and permuting of operands.
FIG. 8 is an exemplary chart of possible data types of operands that can be selected.

Referring now to FIG. 6, the general format for the data type of an operand for the present invention is illustrated. In the present invention, the data type for an operand may be represented in the format of N×SR for a real data type or N×SC for a complex or imaginary data type. N refers to the number of signal processing units 300 to which this given operand should be routed. S indicates the size in bits of the operand. R refers to a real data type. C refers to a complex or imaginary data type having a real and imaginary numeric component. In one embodiment of the present invention, the size of the multiplication units is sixteen bits wide and the size of the adders is forty bits wide. In one embodiment of the present invention, the memory bus is sixty four bits wide so that an operand being transferred from memory may have a width in the range of zero to sixty four bits.

For multiplicands, the operands preferably have a bit width of multiplies of 4, 8, 16, and 32. For minuend, subtrahends and addends, the forty bit adders preferably have operands having a bit width of multiplies of 4, 8, 16, 32, and 40. In the case that the data type is a complex operand, the operand has a real operand and an imaginary operand. In order to designate the type of operand selected, control registers and instructions of the instruction set architecture include a data type field for designating the type of operand being selected by a user.

Referring now to FIG. 7, an exemplary control register of the instruction set architecture of the present invention is illustrated. In FIG. 7, a memory address register 700 is illustrated for controlling the selection of operands from the data memory 202 to the signal processing units 300. The memory address register 700 illustrates a number of different memory address registers which are designated in an instruction by a pointer rX. Each of the memory address registers 700 includes a type field 701, a CB bit 702 for circular and bit-reversed addressing support, a permute field 703, a first address offset 704, a second zero address offset 705, and a pointer 706. The type field 701 designates the data type of operand being selected. The permute field 703 of the memory address register 700 is explained in detail below.

Referring now to FIG. 8, an exemplary set of data types to be selected for operands is illustrated. The data type is encoded as a four bit field in either a control register, such as the memory address register 700, or a DSP instruction directly selecting an operand from a register or memory location. For example, for the data type field 701 having a value of 0000, the operand has a data type of 1×16 real. As another example, for the data type field 701 having a value of 0111, the operand has a 2×16 complex data type.

As yet another example, for the data type field 701 having a value of 1001, the data type of the operand is a 2×32 complex operand. The data type field 701 is selected by a user knowing the number of operations that are to be processed together in parallel by the signal processing units 300 (i.e. N of the data type) and the bit width of the operands (i.e. S of the data type).

The permute field in control registers, such as the memory address register 700, and instructions allows broadcasting and interchanging operands between signal processing units 300. Referring momentarily back to FIG. 3, the X data bus 531, the Y data bus 533, and the Z data bus 532 between the data memory 202 and signal processing units 300 are sixty four bits wide. Because there are four signal processing units 300A–300D, it is often times desirable for each to receive an operand through one memory access to the data memory 202. On other occasions, it maybe desirable for each signal processing unit 300A–300D to have access to the same operand such that it is broadcast to each.

Referring now to FIG. 9, an exemplary set of permutations to select operands for the signal processing units is illustrated. The permutation in the preferred embodiment is encoded as a five bit field in either a control register, such as permute field 702 in the memory address register 700, or a DSP instruction. The permute field provides the capability of designating how 16-bit increments of the 64-bit data bus are coupled into each of the signal processing units 300A–300D. In FIG. 9, the sixty four bits of the X data bus 531/Y data bus 533 (labeled data busses 203 in FIGS. 2–3) can be designated at the top from right to left as 0–15, 16–31, 32–47, and 48–63. The permutation of operands on the data bus for the given permute field is in the center while the permutation type is listed to the right. The data bus permutations in the center are labeled permutations 203A through 203L.

While the data on the respective data bus does not change position, the five bit permute field illustrated to the left of the 64-bit data bus re-arranges how a sixteen bit data field (labeled A, B, C, and D) on the respective data bus is received by each of the signal processing units 300A–300D. This is how the desired type of permutation is selected. That is the right most sixteen bit column can be considered as being coupled into SP3 300D over the permutations. The second column from the right can be considered as being coupled into the signal processing unit SP2 300C over the permutations. The third column from the right can be considered as being coupled into the signal processing unit SP1 300B over the permutations. The left most, fourth column from the right, can be considered as being coupled into the signal processing unit SP0 300A over the permutations.

In a regular access without any permutation corresponding to data bus permutation 203A, bits 0–15 of the data bus are designated as D, bits 16–31 are designated as C, bits 32–47 are designated as B, and bits 48–63 are designated as A. This corresponds to the permute field being 00000 in the first row, permutation 203A, of the chart in FIG. 9. With regular access chosen for each of the signal processing units 300A–300D to the sixty four bit data bus, the sixteen bits labeled A are coupled into SP3 300D for example. The sixteen bits labeled D are coupled into the signal processing unit SP2 300C. The sixteen bits labeled C are coupled into the signal processing unit SP1 300B. The sixteen bits labeled D are coupled into the signal processing unit SP0 300A.

In the permute field, the most significant bit (Bit 26 in FIG. 9) controls whether the bits of the upper half word and the bits of the lower half word of the data bus are interchangeably input into the signal processing units 300. For example as viewed from the point of view of the signal processing units 300A–300D, the data bus appears as data bus permutation 203B as compared to permutation 203A. In this case the combined data fields of A and B are interchanged with the combined data fields C and D as the permutation across the signal processing units. The next two bits of the permute field (Bits 25 and 24 of permute field 702) determine how the data fields A and B of the upper half word are permuted across the signal processing units. The lowest two bits of the permute field (Bits 23 and 22 of the permute field 702) determine how the data fields C and D of the lower half word are to be permuted across the signal processing units.

Consider for example the case where the permute field 703 is a 00100, which corresponds to the permutation 203C. In this case the type of permutation is a permutation on the half words of the upper bits of the data fields A and B. As compared with permutation 203A, signal processing unit SP1 300B receives the A data field and signal processing unit SP0 300A receives the B data field in permutation 203C.

Consider another example where the permute field 703 is a 00001 bit pattern, which corresponds to the permutation 203D. In this case the type of permutation is a permutation on the half words of the lower bits of the data fields of C and D. the data bus fields of C and D are exchanged to permute half words of the lower bits of the data bus. As compared with permutation 203A, signal processing unit SP3 300D receives the C data field and signal processing unit SP2 300C receives the D data field in permutation 203D.

In accordance with the present invention, both sets of upper bits and lower bits can be permuted together. Consider the case where the permute field 703 is a 00101 bit pattern, corresponding to the permutation 203E. In this case, the permute type is permuting half words for both the upper and the lower bits such that A and B are exchanged positions and C and D are exchanged positions. As compared with permutation 203A, signal processing unit SP3 300D receives the C data field, signal processing unit SP2 300C receives the D data field, signal processing unit SP1 300B receives the A data field and signal processing unit SP0 300A receives the B data field in permutation 203E.

Permutations of half words can be combined with the interchange of upper and lower bits as well in the present invention. Referring now to permutation 203F, the permute field 703 is a 10100 bit pattern. In this case, the upper and lower bits are interchanged and a permutation on the half word of the upper bits is performed such that A and B and C and D are interchanged and then C and D is permuted on the half word. As compared with permutation 203A, signal processing unit SP3 300D receives the B data field, signal processing unit SP2 300C receives the A data field, signal processing unit SP1 300B receives the C data field and signal processing unit SP0 300A receives the D data field in permutation 203F. Referring now to permutation 203G, the permute field 703 is a 10001 bit pattern. In this case the data bus fields are interchanged and a permutation of the half word on the lower bits is performed resulting in a re-orientation of the data bus fields as illustrated in permutation 203G. Referring now to permutation 203H, the permute field 703 is a 10101 bit pattern. In this case, the data bus fields are interchanged and a permutation of half words on the upper bits and the lower bits has occurred resulting in a re-orientation of the data bus fields as illustrated in permutation 203H.

Broadcasting is also provided by the permute field as illustrated by permutations 203I, 203J, 203K, and 203L. For example consider permutation 203I corresponding to a permute field 703 of a 01001 bit pattern. In this case, the data field A is broadcasted to each of the signal processing units 300A–300D. That is each of the signal processing units 300A–300D read the data field A off the data bus as the operand. For the permutation 203J having the permute field of 01100 bit pattern, the data field B is broadcast to each of the signal processing units. For permutation 203K having the permute field of a 00010 bit pattern, the data field C is broadcast to each of the signal processing units 300A–300D. For permutation 203L, the permute field is a 00011 combination and the data field D is broadcast to each of the signal processing units 300A–300D. In this manner various combinations of permutations and interchanging of data bus fields on the data bus can be selected for re-orientation into the respective signal pressing units 300A through 300D. The Z output bus 532 carries the results from the execution units back to memory. The data on the Z output bus 532 is not permuted, or typed as it goes back to memory. The respective signal processing units 300A–300D drive the appropriate number of data bits (16, 32 or 64) onto the Z output bus 532 depending upon the type of the operations. The memory writes the data received from the Z output bus 532 using halfword strobes which are driven with the data to indicate the validity.

Figure 10:
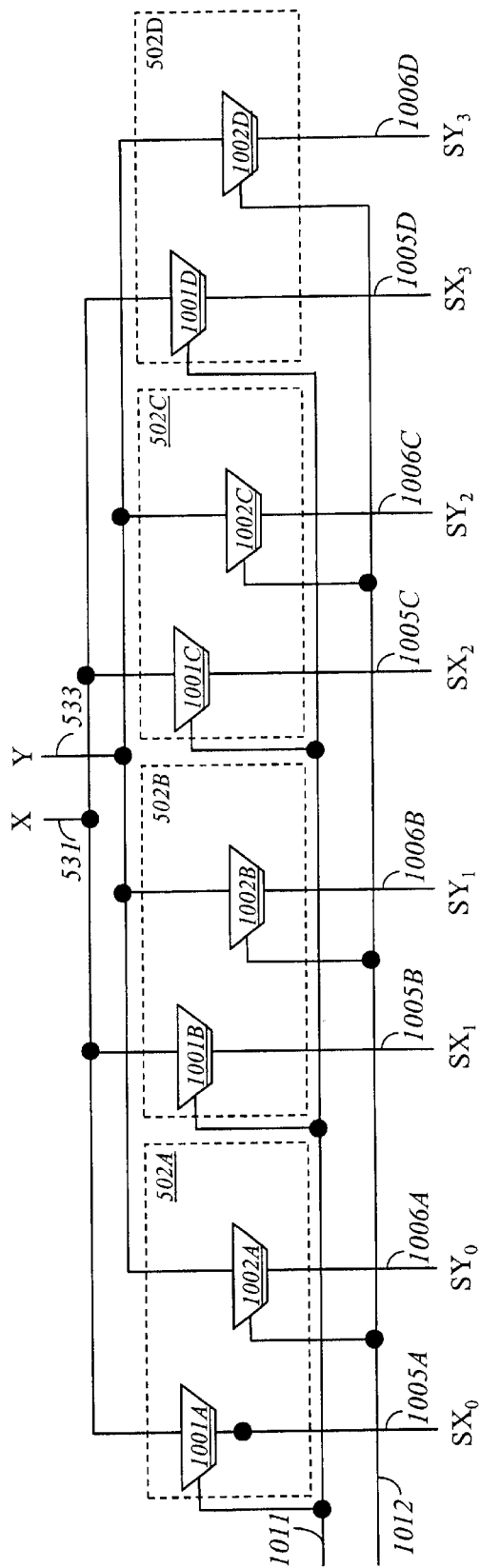
FIG. 10 is a block diagram of a cross sectional block diagram of the data typer and aligner of each signal processing unit of FIG. 3.

Referring now to FIG. 10, a cross-sectional block diagram illustrates the data type and aligners 502A, 502B, 502C and 502D of the signal processing blocks 300A, 300B, 300C and 300D respectively. Each of the data type and aligners 502A, 502B, 502C and 502D includes an instance of a bus multiplexer 1001 for the X bus 531 and a bus multiplexer 1002 for the Y bus 533. For example, the data typer and aligner 502A of signal processing unit SP0 300A includes the bus multiplexer 1001A and the bus multiplexer 1002A. The multiplexer 1001A has an input coupled to the X bus 531 and an output coupled to the SX0 bus 1005A. The bus multiplexer 1002A has an input coupled to the Y bus 533 and an output coupled to the SY0 bus 1006A. A control bus 1011 is coupled to each instance of the bus multiplexers 1001 which provides independent control of each to perform the data typing alignment and any permutation selected for the X bus 531 into the signal processing units. A control signal bus 1011 is coupled into each of the bus multiplexers 1001A–1001D. A control signal bus 1012 is coupled into each of the bus multiplexers 1002A–1002D. The control signal buses 1011 and 1012 provide independent control of each bus multiplexer to perform the data typing alignment and any permutation selected for the X bus 531 and the Y bus 533 respectively into the signal processing units 300. The outputs SX0 bus 1005 and SY0 bus 1006 from each of the bus multiplexers 1001 and 1002 couple into the multiplexers of the adders and multipliers within the respective signal processors 300 for selection as the X and Y operands respectively.

Figure 11:
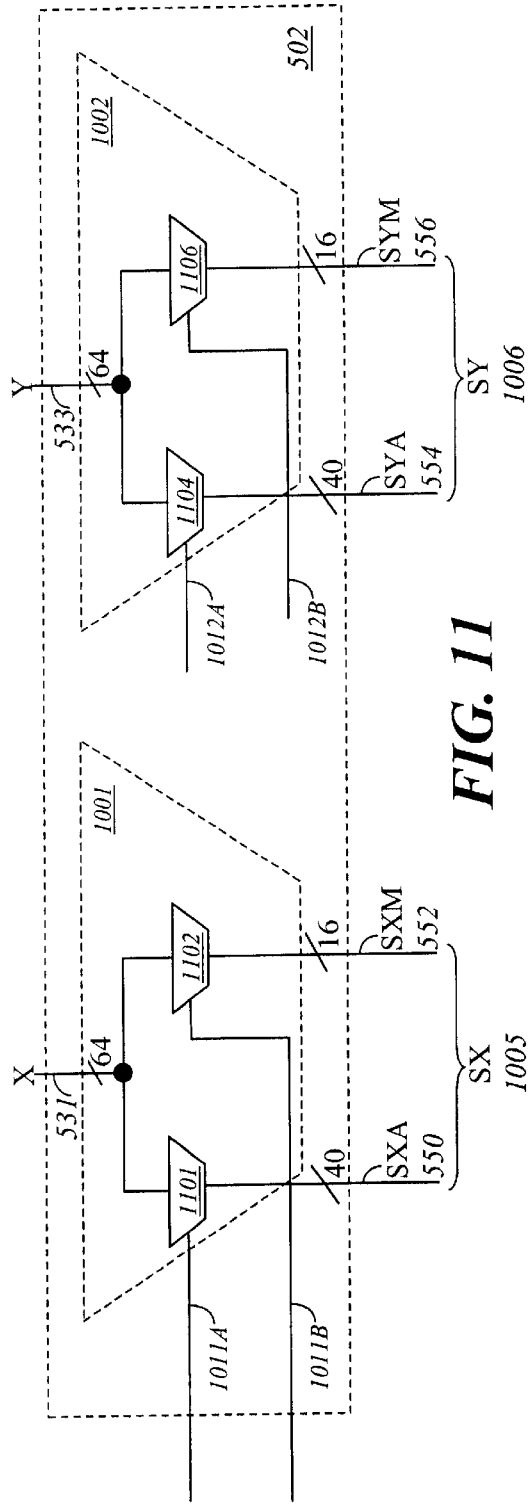
FIG. 11 is a block diagram of the bus multiplexers included in the data typer and aligner of each signal processing unit of FIG. 10.

Referring now to FIG. 11, an instance of each of the bus multiplexer 1001 and 1002 are illustrated labeled 1001 and 1002 respectively. Each instance of the bus multiplexer 1001 includes multiplexers 1101 and 1102 to multiplex data from the X bus 531 onto each SXA bus 550 and SXM bus 552 respectively within each signal processing unit 300. Each instance of the bus multiplexer 1002 includes multiplexers 1104 and 1106 to multiplex data from the Y bus 533 onto each SYA bus 554 and each SYM bus 556 respectively within each signal processing unit 300. In the preferred embodiment, the X bus 531 is sixty four bits wide all of which couple into the multiplexers 1101 and 1102 for selection. In the preferred embodiment, the Y bus 533 is sixty four bits wide all of which couple into the multiplexers 1104 and 1106 for selection. The output SXA 550 of multiplexer 1101 and the output SYA 554 of multiplexer 1104 in the preferred embodiment are each forty bits wide for coupling each into the adder A1 510A and adder A2 510B. The output SXM 552 of multiplexer 1102 and the output SYM 556 of multiplexer 1106 in the preferred embodiment are each sixteen bits wide for coupling each into the multiplier M1 504A. The output buses SXA 550 and SXM 552 form the SX buses 1005 illustrated in FIG. 10 for each signal processing unit 300. The output buses SYA 554 and SYM 556 form the SY buses 1006 illustrated in FIG. 10 for each signal processing unit 300. The control signal bus 1011 has a control signal bus 1011A which couples into each multiplexer 1101 and a control signal bus 1011B which couples into each multiplexer 1102 for independent control of each. The control signal bus 1012 has a control signal bus 1012A which couples into each multiplexer 1104 and a control signal bus 1012B which couples into each multiplexer 1106 for independent control of each.

Multiplexers 1101 and 1102 in each of the data typer and aligners 502 of each signal processing unit receive the entire data bus width of the X bus 531. Multiplexers 1104 and 1106 in each of the data typer and aligners 502 of each signal processing unit receive the entire data bus width of the Y bus 533. With all bits of each data bus being available, the multiplexers 1101, 1102, 1104, and 1106 can perform the flexible data typing, data alignment, and permutation of operands. In response to the control signals on the control signal buses 1011 and 1012, each of the multiplexers 1101, 1102, 1104, and 1106 independently picks which bits of the X bus 531 or the Y bus 533 to use for the respective operand for their respective signal processor 300, align the bits into proper bit positions on the output buses SXA 550, SXM 552, SYA 554, and SYM 556 respectively for use by sixteen bit multipliers (M1 504A) and forty bit adders (A1 510A and A2 510B)

In the alignment process, the multiplexers 1101, 1102, 1104, and 1106 also insert logical zeroes and/or ones into appropriate bit positions to properly align and provide for sign and guard bit extensions. For example multiplexer 1101A of signal processing unit 300A may select bits 0–15 of the sixty four bits of the X bus 531 as the operand for an adder and multiplex those bits into bit positions 31–16 and insert zeroes in bit positions 0–15 and sign-extend bit 31 into bit positions 32–39 to make up a forty bit operand on the SXA bus 550. To perform permutations, the multiplexers select which sixteen bits (A, B, C, or D) of the sixty four bits of the X bus and Y bus is to be received by the respective signal processing unit 300. For example consider a broadcast of A on the Y bus 533 for a multiplication operation, each of the multiplexers 1106 for each signal processing unit 300 would select bits 0–15 (corresponding to A) from the Y bus 533 to be received by all signal processing units 300 on their respective SYM buses 556.

The multiplexers 1101, 1102, 1104, and 1105 in response to appropriate control signals, automatically convert the number of data bits from the data bus into the appropriate number of data bits of an operand which the adder can utilize. Furthermore in response to appropriate control signals, the multiplexers 1101, 1102, 1104, and 1105 select the appropriate data off the X bus and the Y bus. In order to do so, the multiplexers 1101, 1102, 1104, and 1105 in each signal processing unit operate more like cross point switches where any bit of the X or Y bus can be output into any bit of the SXA, SXM, SYA or SYM buses and logical zeroes/ones can be output into any bit of the SXA, SXM, SYA or SYM buses. In this manner the multiplexers 1101, 1102, 1104, 1106 can perform a permute functionality and align the bits accordingly for use by a 40-bit adder or a 16-bit multiplier.

Referring now to FIGS. 12A–12G, charts of alignment of real and imaginary flexible data types are illustrated for the sixteen bit multipliers and the forty bit adders of the preferred embodiment of the present invention. In each row of each chart, the data type is illustrated in the left most column, the output onto one or more of the SXA, SYA, SXM or SYM data buses is illustrated in the center column and the right most column illustrates the equivalent signal processing configuration of the signal processors 300A–300D of a core processor 200 to perform one operation. The data type is illustrated in a vectorized format using the variable N to signify the number of vectors or times that the operand will be used. When the variable N is one, it is expected that one operation will be performed with one set of X and Y operands. When the variable N is two, it is expected that two operations will be performed together in one cycle on two sets of X and Y operands. In any case, two operand data types need to be specified and if there is a mismatch, that is the data types do not match, data type matching needs to occur which is discussed below with reference to FIGS. 13A–13C, 14, and 15.

Data types of 1×4R, 1×8R, 1×16R, 1×32R, 2×4R, 2×8R, 2×16R, 1×4C, 1×8C, 1×16C, 1×32C, 2×4C, 2×8C, and 2×16C for example can all be loaded in parallel into the signal processing units across a 64-bit X and/or Y bus by being packed in four or eight sixteen-bit fields. The full bit width of the data types of 2×32R, 1×40R, and 1×40C can be loaded into the signal processing units together in one cycle if both sixty-four bits of the X and Y bus are used to load two operands during the same cycle. Data types of 2×32C or a higher order may require multiple cycles to load the operands across the 64-bit X and/or Y buses. Additionally, an upper halfword (i.e. sixteen bits) of a 32 or 40 bit operand may be used to match a sixteen bit multiplier for example. In this case the lower bits may be discarded as being insignificant to the operation. Other bit widths of a halfword can be accommodated to match other hardware components of a given bit width. Using halfwords, allows the data types of 2×32R, 1×40R and 1×40C allows the operands to be loaded into fewer signal processing units and avoid carry paths that might otherwise be needed.

Referring now to FIG. 12A, an exemplary chart of the alignment of data types 1×4R, 1×8R, 1×16R, 1×32R, and 1×40R into a forty bit adder is illustrated. The sign bit in each case, with the exception of the forty bit data type of 1×40R, is located in bit 31 of the forty bit data word and coupled into the forty bit adders. The data field in each case is from memory on the X or Y bus or from a register off a different bus.

The four bit data field of a 1×4R data type from the X or Y bus is aligned into bit positions 28–31 with the sign bit in bit 31 of the SXA or SYA bus. The sign bit is included as the most significant bit (MSB) in a 4, 8, 16, or 32 bit word of an operand. Zeros are packed or inserted into the lower significant bits (LSBs) of bits 0–27 of the SXA bus or SYA bus in order to fill in. Guard bits, which contain the extended sign bit 31, are allocated to bits 32–39 of SXA or SYA. In this manner, the 1×4R data type is converted into a forty bit word which is utilized by one of the forty bit adders in a signal processing unit 300 for an addition, subtraction or a min/max operation.

The eight bit data field of the 1×8R data type from the X or Y bus is aligned into bits 24–31 of SXA or SYA with a sign bit in bit 31. Zeros are packed or inserted into the LSBs of bits 0–23. Guard bits, which contain extended sign bit 31, are allocated to bits 32–39. In this manner the 1×8R data type is converted into a forty bit word which is utilized by one of the forty bit adders in a signal processing unit 300 for an addition, subtraction or a min/max operation.

For an 1×16R data type, the 16 bit data field from the X or Y bus is aligned into bits 16–31 with the sign bit being included in bit 31 onto the SXA or SYA bus. Zeros are packed or inserted into the LSBs of bits 0–15 while guard bits are allocated to bits 32–39. In this manner the 1×16R data type is converted into a forty bit word which is utilized by one of the forty bit adders in a signal processing unit 300 for an addition, subtraction or a min/max operation.

For an 1×32R data type, the thirty two bit data field from the X or Y bus is aligned into bits 0–31 with the sign bit included as bit 31. Guard bits, which contain extended sign bit 31, are packed together into bits 32–39 to complete the forty bit word. In this manner 1×32R data type is converted is converted into a forty bit word which is utilized by one of the forty bit adders in a signal processing unit 300 for an addition, subtraction or a min/max operation.

For an 1×40R data type, all forty bits of its data field from the X or Y bus are allocated into bits 0–39 of the SXA or SYA bus such that one adder of a signal processing unit can perform an addition, subtraction or a min/max operation using all forty bits of the data field at a time.

As previously discussed, multiplexers 1101 and 1104 facilitate the conversion of the real data types into 40-bit fields for use by a forty bit adder in a signal processing unit. Each of these multiplexers will switch the data fields to the appropriate bit locations including the sign bit and fill zeros into the unused LSBs and allocate the guard bits as necessary for SXA bus 550 and the SYA bus 554 bus.

Referring now to FIG. 12B, an exemplary chart of the alignment of the real data types 1×4R, 1×8R, 1×16R, 1×32R, and 1×40R into sixteen bit words for sixteen bit multipliers is illustrated. For an 1×4R data type, bits 0–3 of the four bit data field from the X or Y bus is aligned into bit positions 12–15 respectively of the SXM or SYM bus. Zeros are packed or inserted into the lower significant bits (LSBs) of bits 0–11 of the SXA or SYA bus in order to fill in. In this manner, one data sample of the 1×4R data type is converted into a sixteen bit word which is utilized by one of the sixteen bit multipliers in a signal processing unit 300 for a multiplication or MAC operation.

For an 1×8R data type, bits 0–7 of the eight bit data field from the X or Y bus are located in bits 8–15 respectively of the SXM or SYM bus with zeros packed into bits 0–7. In this manner the 1×8R data type is converted into a sixteen bit word for use by one sixteen bit multiplier of one signal processing unit 300.

For an 1×16R data type, bits 0–15 of the sixteen bit data field from the X or Y bus is aligned into bits 0–15 of the SXM or SYM bus such that one signal processing unit can multiply all 16 bits at a time.

For a data type of 1×32R, bits 0–32 of the data field from the X or Y bus are split into two sixteen bit half words. Bits 16–31 are aligned into an upper half word into bit bits 0–15 of the SXM or SYM bus of a signal processing unit 300. In one embodiment, the lower half word of bits 0–15 of the operand are discarded because they are insignificant. In this case, one signal processing unit is utilized to process the sixteen bits of information of the upper half word for each operand. In an alternate embodiment, the lower half word of bits 0–15 may be aligned into bits 0–15 of the SXM or SYM bus of another signal processing unit 300. In this case, two signal processing units are utilized in order to multiply the sixteen bits of information for each half word and the lower order signal processing unit has a carry signal path to the upper order signal processing unit in order to process the 32-bit data field. However, by using an embodiment without a carry signal path between signal processing units, processing time is reduced.

For a data type of 1×40R, bits 0–39 of the forty bit data field from the X or Y bus in one embodiment is reduced to a sixteen bit halfword by discarding the eight most significant bits (MSBs) and the sixteen least significant bits (LSBs). In this case bits 16–31 of the forty bits of the original operand is selected as the multiply operand for one signal processing unit.

As previously discussed, multiplexers 1102 and 1106 facilitate the conversion of the real data types into sixteen bit fields for use by a sixteen bit adders in a signal processing unit. Each of these multiplexers will switch the data fields to the appropriate bit locations including the fill zeros into the unused LSBs as necessary for SXM buses 552A/552B and the SYM buses 556A/556B. Each of the multiplexers 1102 and 1106 perform the permutation operation, the alignment operation, and zero insertion for the respective multipliers in each of the signal processing units 300A–300D.

Referring now to 12C, an exemplary chart of the alignment of the complex data types 1×4C, 1×8C, 1×16C, 1×32C, 1×32C, and 1×40C into one or more forty bit words for one or more forty bit adders is illustrated.

For complex data types at least two signal processing units are utilized to perform the complex computations of the real and imaginary terms. For the forty bit adders, typically one signal processing unit receives the real data portion while another signal processing unit receives the imaginary data portion of complex data type operands.

For an 1×4C data type, bits 0–4 of the real data field are aligned into bits 28–31 respectively with a sign bit in bit position 31 of a first forty bit word. Guard bits are added to bit fields 32–39 while zeros are inserted into bits 0–27 of the first forty bit word. Similarly, bits 0–4 of the imaginary data field are aligned into bits 28–31 respectively with a sign bit in bit position 31 of a second forty bit word. Guard bits are allocated to bits 32–39 while zeros are packed into bits 0–27 of the second forty bit word. In this manner, 1×4C complex data types are converted into two forty bit words as operands for two forty bit adders in two signal processing units.

For an 1×8C data type, bits 0–7 of the real data field from the X or Y bus is located into bit positions 24–31 with a sign bit in bit position 31 of a first forty bit operand on one the SXA or SYA buses. Guard bits are allocated to bit positions 32–39 while zeros are packed into bits 0–23 of the first forty bit operand. Bits 0–7 of the complex data field from the X or Y bus is aligned into bits 24–31 with a sign bit in bit position 31 of a second forty bit operand on another one of the SXA or SYA buses. Guard bits, which are also initially zeroes, are allocated to bit positions 32–39 while zeros are packed into bits 0–23 of the second forty bit operand. In this manner, 1×8C complex data types are converted into two forty bit words as operands for two forty bit adders in two signal processing units.

For an 1×16C data type, bits 0–16 of the real data field from the X or Y bus are aligned into bits 16–31 with a sign bit in bit position 31 for a first forty bit operand on one of the SXA or SYA buses. Guard bits are allocated to bit positions 32–39 with zeros packed into bit positions 0–15 of the first forty bit operand. Similarly, bits 0–16 of the imaginary data field from the X or Y bus are aligned into bits 16–31 including a sign bit in bit 31 for a second forty bit operand onto another one of the SXA or SYA buses. Guard bits are allocated to bit positions 32–39 and zeros are packed into bit position 0–15 of the second forty bit operand on the SXA or SYA bus.

For an 1×32C data type, bits 0–31 of the 32-bits of real data are aligned into bits 0–31 respectively with a sign bit included in bit position 31 of a first forty bit operand on one of the SXA or SYA buses. Guard bits are allocated to bit positions 32–39 for the first forty bit operand. Similarly, bits 0–31 of the imaginary data field are aligned into bit positions 0–31 with the sign bit being bit position 31 of a second forty bit operand on another of the SXA or SYA buses. Guard bits are inserted into bits 32–39 of the second forty bit operand. Thus, the 1×32C data type is converted into two forty bit operands for two forty bit adders of two signal processing units 300 for processing both the imaginary and real terms in one cycle.

For an 1×40C complex data type, bits 0–39 of the real data field from the X or Y bus are aligned into bits 0–39 of a first forty bit operand on one of the SXA or SYA buses for use by one signal processing unit. Bits 0–39 of the imaginary data field from the X or Y bus is aligned into bit positions 0–39 of a second forty bit operand on another of the SXA or SYA buses for use a second signal processing unit such that two signal processing units may be used to process both 40 bit data fields in one cycle.

Referring now to FIG. 12D, an exemplary chart of the alignment of the complex data types 2×16C, 2×32C, and 2×40C into four forty bit words for four forty bit adders is illustrated. In this case two sets of operands (Data 1 and Data 2) are brought in together in the same cycle having flexible bit widths.

For the 2×16C complex data type, four 16-bit data fields from the X or Y bus are aligned into four forty bit operands, one for each of the signal processing units 300A–300D. Bits 0–15 of the real data field for DATA 1 from the X or Y bus is aligned into bits 16–31 respectively of a first forty bit operand including the sign bit in bit position 31 on one of the SXA or SYA buses for a first signal processing unit. Bits 0–15 of the complex data field for DATA 1 from the X or Y bus are aligned into bits 16–31 respectively of a second forty bit operand including the sign bit in bit position 31 on another of the SXA or SYA buses for a second signal processing unit. Bits 0–15 of the real data field for DATA 2 from the X or Y bus is aligned into bits 16–31 respectively of a third forty bit operand including the sign bit in bit position 31 on yet another one of the SXA or SYA buses for a third signal processing unit. Bits 0–15 of the complex data field for DATA 2 from the X or Y bus are aligned into bits 16–31 respectively of a fourth forty bit operand including the sign bit in bit position 31 on still another of the SXA or SYA buses for a fourth signal processing unit. Zeros are packed into bit positions 0–15 and guard bits are allocated to bits 32–39 in each of the forty bit operands on the four SXA or four SYA buses as shown in FIG. 12D. Thus, the 2×16C complex data type is aligned into four forty bit operands for use by four forty bit adders in four signal processing units.

The 2×32C complex data type and the 2×40C complex data type are aligned into four operands similar to the 2×16 data type but have different bit alignments and insertion of zeros or allocation of guard bits. These bit alignments and zero packing/insertions and guard bit allocations are shown as illustrated in FIG. 12D.

In this manner two 2×SC complex data types, where S is limited by the width of the adder, can be aligned into four operands for use by four adders in four signal processing units 300 to process the complex data types in one cycle.

Referring now to FIG. 12E, an exemplary chart of the alignment of the complex data types 1×4C, 1×8C, 1×16C, 1×32C, and 1×40C into one or more sixteen bit words for one or more sixteen bit multipliers is illustrated.

For an 1×4C complex data type, bits 0–3 of the real data field from the X or Y bus is aligned into bits 12–15 respectively of a first sixteen bit operand on one of the SXM or SYM buses as illustrated in FIG. 12E. Bits 0–3 of the imaginary data field from the X or Y bus is aligned into bits 12–15 respectively of a second sixteen bit operand on another one of the SXM or SYM buses. Bits 0–11 of each of the first and second sixteen bit operands are packed with zeros. In this manner, the each complex element of a 1×4C complex data types is converted into two sixteen bit words as operands for two sixteen bit multipliers in two signal processing units. The 1 by 8C data type and the 1×16C data types are similarly transformed into two sixteen bit operands as is the 1×4C but with different bit alignment as shown and illustrated in FIG. 12E. The complex data types 1×4C, 1×8C, and 1×16C in FIG. 12E utilize two signal processing units and align their respective data bit fields into two sixteen bit words for use by two sixteen bit multipliers in two signal processing units on one cycle.

For a 1×32C complex data type with operands having bits 0–31, the upper half word of bits 16–31 of the real and imaginary parts of each operand are selected and multiplexed from the buses SXM or SYM into two sixteen bit multipliers in one embodiment while the lower half word is discarded. In an alternate embodiment, the upper half word and the lower half word for the real and imaginary parts are multiplexed into four sixteen bit multipliers for multiplication with a carry from the lower half word multiplier to the upper half word multiplier.

For a 1×40C complex data type with operands having bits 0–39, a middle half word of bits 16–31 of the real and imaginary parts of each operand are selected and multiplexed from the buses SXM or SYM into two sixteen bit multipliers in one embodiment while the upper bits 32–39 and the lower half word bits 0–15 are discarded. In an alternate embodiment, the word is separated by the multiplexers across multiple multipliers with carry from lower order multipliers to upper order multipliers for the real and imaginary terms of the complex data type.

Figure 12C:
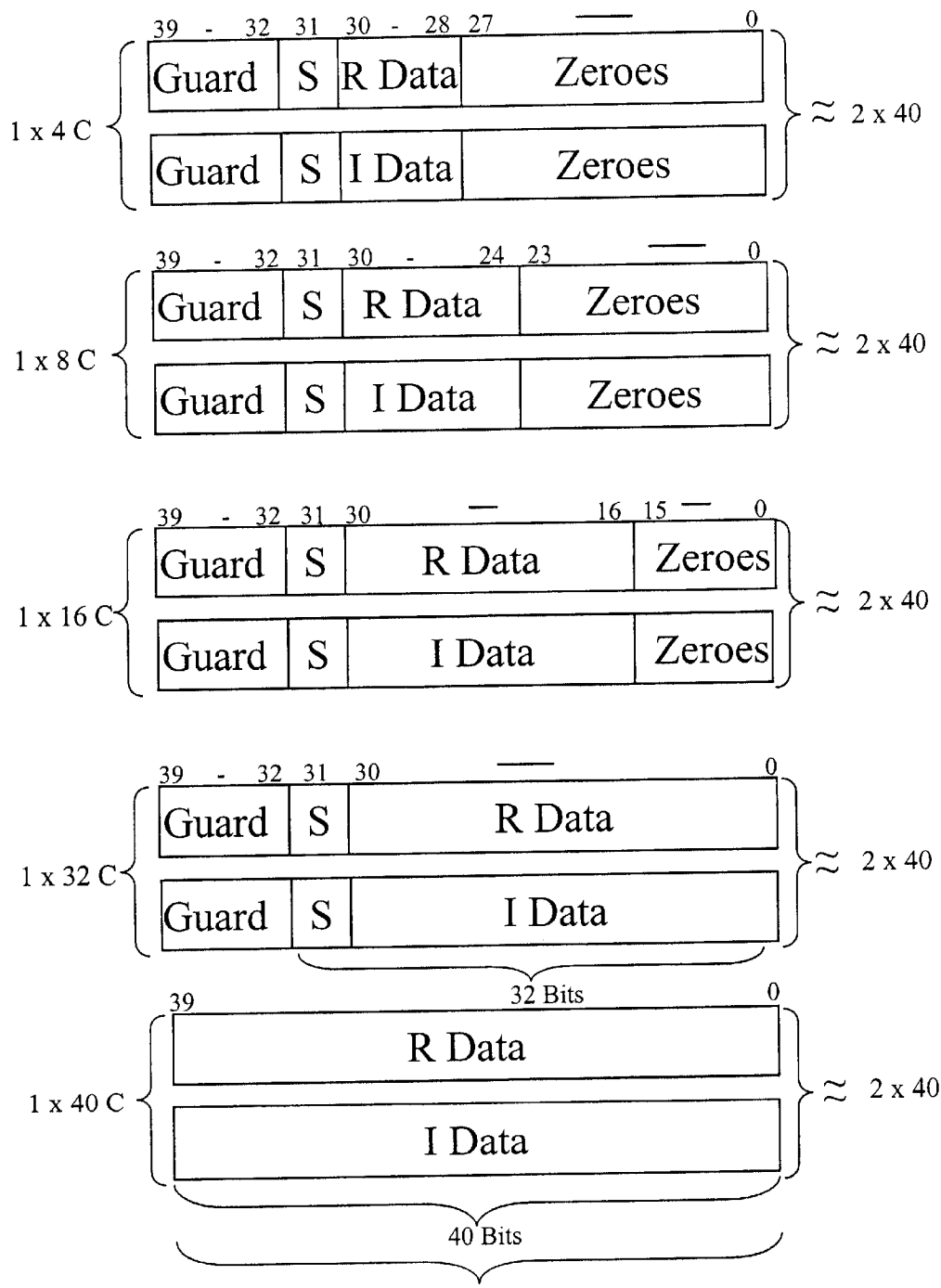
FIG. 12C is a first chart of complex data types and their alignment for the adders of the signal processing units.
Figure 12F:
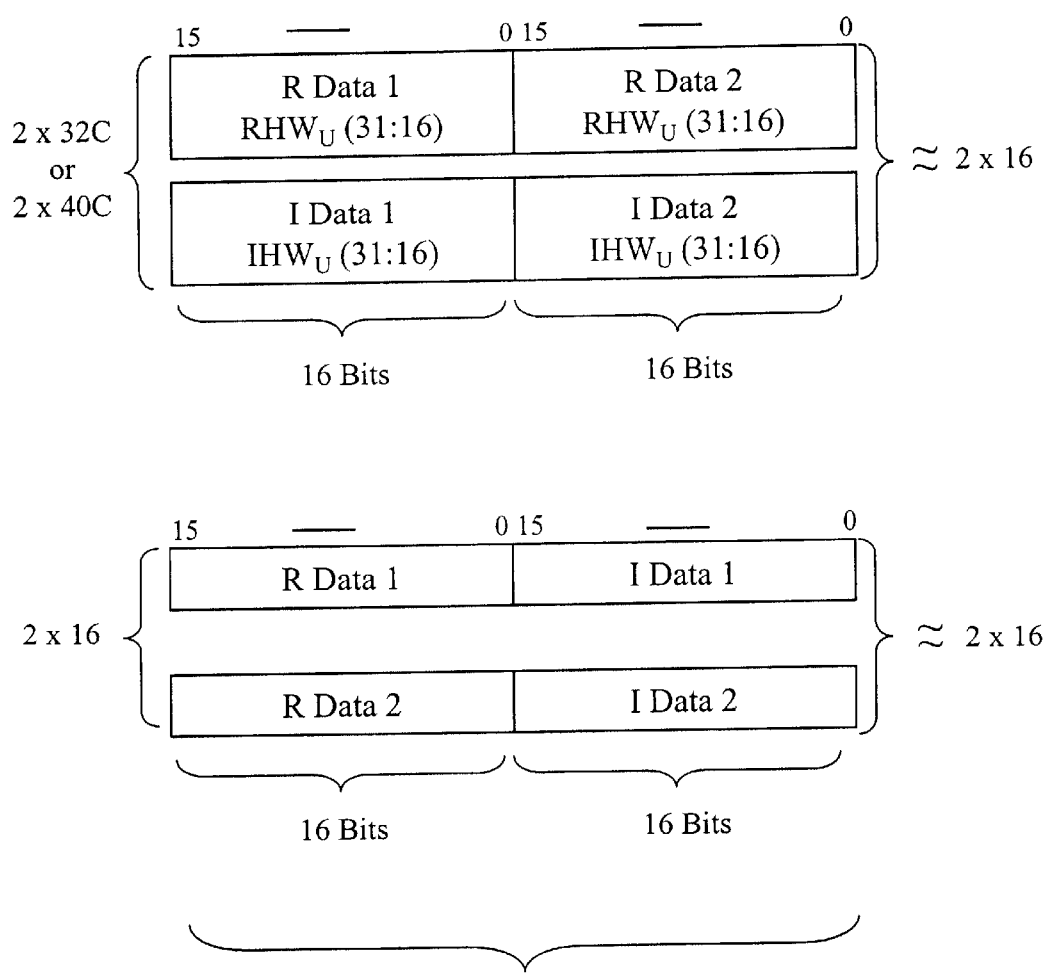
FIG. 12F is a second chart of complex data types and their alignment for the multipliers of the signal processing units.

Referring now to FIG. 12F, an exemplary chart of the alignment of the complex data types 2×32C or 2×40C and 2×16C into four sixteen bit words for four sixteen bit multipliers is illustrated.

For 2×32C data types, bits 0–15 of the upper half word of the real data (RHWu) of a first operand on the X or Y bus are aligned into bits 0–15 respectively of a first sixteen bit operand on one of the SXM or SYM buses for a first of the signal processing units and bits 0–15 of the upper half word of the real data field of a second operand from the X or Y bus are aligned into bits 0–15 of a second sixteen bit operand on another one of the SXM or SYM buses for the first signal processing unit. Bits 0–15 of the upper half word (IHWu) of the imaginary data of the first operand on the X or Y bus are aligned into bit positions 0–15 of a third sixteen bit operand on another one of the SXM or SYM buses for a second signal processing unit and bits 0–15 of the upper half of the imaginary data of the second operand on the X or Y bus are aligned into bits 0–15 of a fourth sixteen bit operand on another one of the SXM or SYM buses for the second signal processing unit. Thus, the 2 by 32C complex data type uses two signal-processing units and converts the 32-bit real and imaginary data fields into 16-bit operands for use by the 16-bit multipliers in two signal processing units.

For 2×16C data types, two complex operands can be specified and multiplexed as one across a sixty four bit data bus into two multipliers. In this case, bits 0–15 of real data field of the first operand from the X or Y bus is aligned into bits 0–15 of a first sixteen bit operand on one of the SXM or SYM buses for one signal-processing unit while bits 0–15 of the imaginary data of the first operand on the X or Y bus is aligned into bits 0–15 of a second sixteen bit operand on another of the SXM or SYM buses for a second signal-processing unit. Bits 0–15 of real data field of the second operand on the X or Y bus is aligned into bits 0–15 of a third sixteen bit operand for the first signal processing unit and bits 0–15 of the imaginary data field of the second operand on the X or Y bus is aligned into bits 0–15 of a fourth sixteen bit operand on another one of the SXM or SYM buses for the second signal processing unit. Thus, the 2×16C data type uses four signal processing units to process each of four sixteen bit operands in four 16-bit multipliers in one cycle.

Referring now to FIGS. 13A, 13B and 13C, the general rule for type matching of two operands is illustrated. Generally, data type matching refers to matching two different data types of two operands together so that they can be properly processed for a given digital signal processing operation. In FIG. 13A, the first operand, operand 1, has a data type of $N_1$ by $S_1$ real and the second operand, operand 2, has a data type of $N_2$ by $S_2$ real. The general rule for operand type matching of two real data types is to determine and select the maximum of $N_1$ or $N_2$ and the maximum of $S_1$ or $S_2$. Alternatively, one can determine and discard the minimum of $N_1$ or $N_2$ and the minimum of $S_1$ or $S_2$ to provide operand type matching. Operand data type matching provides an indication of the number of signal-processing units that the operands are to be processed by (maximum of $N_1$ or $N_2$) and the bit width of both operands (maximum of $S_1$ or $S_2$). For the different operand types the multipliers and adders of the signal processing units are provided with the best operand type match of two different operand data types in order to obtain a result. The output results from the operation preformed on the disparate operands is in the form of the matched data type.

Referring now to FIG. 13B, both the first operand, operand 1, and the second operand, operand 2, are complex data types. The general rule for operand type matching of two complex types of operands is the similar for matching two real data types but resulting in a complex data type. The operand data type matching for the complex data types is to determine and select the maximum of $N_1$ or $N_2$ and the maximum of $S_1$ or $S_2$.

Referring now to FIG. 13C, the first operand, operand 1, is a real data type while the second operand, operand 2, is a complex data type. The general rule for operand data type matching of a real data type and a complex data type is to select the maximum of $N_1$ or $N_2$ and the maximum of $S_1$ or $S_2$ which has a complex data type match. The maximum of $N_1$ or $N_2$ represents the number of signal-processing units needed for processing the real or the imaginary term and the maximum of Si or S2 represents the bit width of the operand that is to be aligned into the signal-processing units. Multiplexers 1101 1102, 1104, and 1106 in each instance of the data typer and aligner 502, perform the data type matching between operand 1 and operand 2 from the X bus 531 or the Y bus 533 in response to appropriate multiplexer control signals. Permutation and alignment is automatically selected by the respective core processor 200 to provide the data type matching for the two operands through control of the bus multiplexers into each of the signal processing units.

In addition to automatic data type matching, the present invention operationally matches the data types in response to the operation to be performed (ADD, SUB, MULT, DIVIDE, etc.), the number of functional units (adders and multipliers) and their respective bit widths in each of signal processing units 300A–300D, the bit width of automatic data type match for the two operands, and whether real or complex data types are involved and scalar or vector functions are to be performed. Each of the signal processing units 300A–300D has two multipliers and three adders. In the preferred embodiment of the present invention, each of the multipliers are sixteen bits wide and each of the adders is forty bits wide. Multiple operands of the same data type can be easily processed after setting up nominal data types and reading new data as the new operands and repeating the multiplication, addition or other type of signal processing operation.

Referring now to FIGS. 14, 15A and 15B, exemplary charts showing operational matching of data types provided by the present invention are illustrated. In each of FIGS. 14, 15A, and 15B, a data type for a first operand is indicated along the top row and a data type for a second operand is indicated along the left most column. The matrix between the top row and the left most column in each of the figures indicates the operational matching provided by the embodiment of the present invention.

In FIG. 14, an exemplary chart showing the data type matching for a multiplication operation by the multipliers of the signal processing units is illustrated. Operands having data types of four and eight bits are not illustrated in FIG. 14 with it being understood that these data types are converted into sixteen bit operands. In FIG. 14, the empty cells are disallowed operations for the embodiment described herein. However, if the number of signal processing units is expanded from four and the data bit width of the multipliers is expanded from sixteen bits, additional operations can be performed for other operand data type combinations. In each completed cell of FIG. 14, the operation requires two cycles for a vector operation and three cycles for a real data type scalar operation. Scalar multiplication of a complex operand with another operand is not performed because two values, a real and an imaginary number, always remain as the result. Each completed cell indicates the number of signal processing units used to perform the multiplication operation. For example, a multiplication of a 1×16C operand with a 1×16C operand indicates that four signal processing units are utilized. In the case of a complex multiplication, the operands are (r1+ji1) and (r2+ji2) where r1 and r2 are the real terms and i1 and i2 are the imaginary terms. The result of the complex multiplication is [(r1×r2)−(i1×i2)] for the real term and [(r1×i2)+(r2×i1)] for the imaginary term. Thus, four signal processing units process the multiplication of the parentheticals together in the same cycle. The remaining add and subtract operations for the real and imaginary terms respectively are then performed in two signal processing units together on the next cycle to obtain the final results. Consider as another example, a multiplication of a 1×16R operand with a 1×32C operand. In this case, FIG. 14 indicates that four signal processing units are utilized. The operands are r1 and (r2+ji2) where r1 and r2 are real numbers and i2 is an imaginary number. The result of the operation is going to be [(r1×r2)] for the real part of the result and [(r1×i2)] for the imaginary part of the result.

Because the complex operand is thirty two bits wide, the real and imaginary terms are split into half words. Thus the operation becomes [(r1×r2UHW)+(r1×r2LHW)] for the real part and [(r1×i2UHW)+(r1×i2LHW)] where UHW is the upper half word and LHW is the lower half word of each value respectively. Thus, each of four signal processing units performs the multiplication of the parenthetical together in one cycle while the addition of terms is performed in two signal processing units on the next cycle.

Referring now to FIG. 15A, an exemplary chart showing the data type matching for scalar addition by the adders of the signal processing units is illustrated. Operands having data types of four and eight bits are not illustrated in FIG. 15A with it being understood that these data types are converted into sixteen bit operands. Note that no scalar addition is performed using a complex operand due to the fact that two values, a real number and an imaginary number, always results in an operation involving a complex operand. In FIG. 15A, the empty cells are disallowed operations for the embodiment described herein. However, if the number of signal processing units is expanded from four and the data bit width of the adders is expanded from forty bits, additional operations can be performed for other operand data type combinations. In each completed cell of FIG. 15A, the scalar add operation can be completed in one cycle if both operands are readily available. Each completed cell indicates the number of signal processing units used to perform the scalar addition operation.

Consider for example a 1×32R operand and a 2×16R operand where r1 is the first operand being 32 bits wide and r2 and r3 is the second set of operands each being sixteen bits wide. The chart of FIG. 15A indicates that two signal processing units are utilized. The scalar result is [(r1+r2)+(r1+r3)]. Two signal processing units perform the addition operation in the parenthetical using their two forty bit adders in one cycle while a second addition in one of the two signal processing units combines the intermediate result in a second cycle.

Referring now to FIG. 15B, an exemplary chart showing the data type matching for the vector addition by the adders of the signal processing units is illustrated. Operands having data types of four and eight bits are not illustrated in FIG. 15B with it being understood that these data types are converted into sixteen bit operands. In FIG. 15B, the empty cells are disallowed operations for the embodiment described herein. However, if the number of signal processing units is expanded from four and the data bit width of the adders is expanded from forty bits, additional operations can be performed for other operand data type combinations. In each completed cell of FIG. 15B, the vector add operation can be completed in one cycle if both operands are readily available. Each completed cell indicates the number of signal processing units used to perform the vector addition operation. Operands having complex data types can be used in performing vector addition.

Consider for example a 1×16R operand and a 1×32C operand where r1 is the first operand being 16 bits wide and r2 and i2 are the second operand each being thirty two bits wide. The chart of FIG. 15B indicates that two signal processing units are utilized. The real 1×16R operand is converted into 1×16C complex operand with an imaginary part of zero. In one signal processing unit the real parts are added together performing (r1+r2) while in another signal processing unit the imaginary component i2 is added to zero performing (0+i2). The vector result is [(r1+r2)] as the real component and i2 as the imaginary component. The signal processing units perform the addition operation in the parentheticals using a forty bit adder.

Consider as another example a 1×16C operand and a 1×32C operand For the 1×16C operand r1 and i1 are the real and imaginary parts respectively of the first operand each being 16 bits wide and r2 and i2 are the real and imaginary terms of second operand each being thirty two bits wide. The chart of FIG. 15B indicates that two signal processing units are utilized. The vector result is [(r1+r2)] as the real component and [(i1+i2)] as the imaginary component. Two signal processing units perform the addition operations in the parentheticals using forty bit adders.

Figure 16:
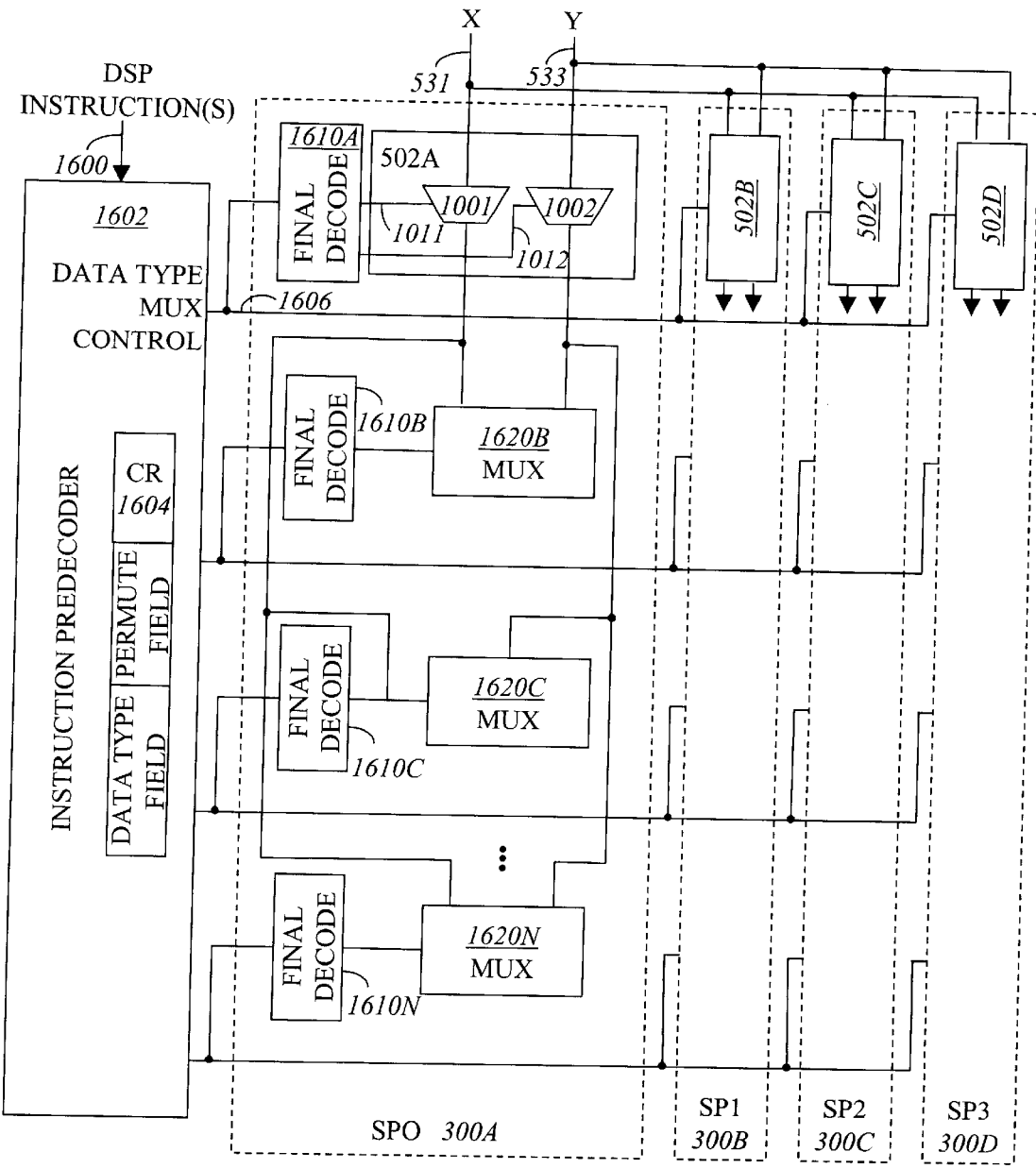
FIG. 16 is a block diagram of the control of the bus multiplexers included in the data typer and aligner of each signal processing unit.

Referring now to FIG. 16, a block diagram illustrating the control signal generation for the bus multiplexers included in each of the data typer and aligners of each signal processing unit. Control signals provided to each of the bus multiplexers of each data typer and aligner provide selective control to perform automatic data typing and alignment and user selected permutations. Control signals to multiplexers 1101 and 1102 of the bus multiplexer for the X bus in each of the data typer aligners selects the data type and alignment for one operand into each of the signal processing units. Controls signals to multiplexers 1104 and 1106 of the bus multiplexer for the Y bus in each of the data typer and aligners selects the data type and alignment for the second operand into each of the signal processing units. Automatic data type matching is provided through control of the bus multiplexers in each signal processor in response to decoding the data type fields associated with each operand from the control register or the instruction itself. The resultant operands output from each of the bus multiplexers in each signal processing unit is coupled into the multiplexer 514A of the multiplier 504A, multiplexer 520A of adder 510A, and multiplexer 520B of adder 510B in each signal processing unit as illustrated in FIG. 5B.

In FIG. 16, one or more DSP instructions 1600 are coupled into an instruction predecoder 1602. The instruction predecoder 1602 may include one or more control registers ("CR") 1604 which include a data type field and a permute field to inform the predecoder 1602 of the data type of the operands and how they are to be read into each of the signal processing units 300 (SP0 300A, SP1 300B, SP2 300C, and SP3 300D). The one or more DSP instructions 1600 directly or indirectly through the one or more control registers 1604, indicate each data type for two operands in two data type fields and any permutation of the data bus in two permute fields. The instruction predecoder 1602 automatically determines the best data type match by comparing the two data types for each operand. The instruction predecoder 1602 also reads the permute fields of each operand. In response to the permute fields and the data types of each operand, the instruction predecoder 1602 generates predecoded control signals 1606 for data typing multiplexing control. The predecoded control signals 1606 are accordingly for the control of the bus multiplexers 1001 and 1002 in each data typer and aligner 502 (data typer and aligner 502A, 502B, 502C, and 502D) in each signal processing unit 300. These predecoded control signals are coupled into the final decoders 1610A in each signal processing unit to generate the multiplexer control signals 1011 and 1012 respectively for each bus multiplexer 1001 and 1002 of each data typer and aligner 502 in each signal processing unit 300. The instruction predecoder 1602 further generates predecoded control signals for other multiplexers 1620B, 1620C through 1620N of each signal processing unit 300. Final decoders 1610B, 1610C through 1610N receive the predecoded control signals to generate the multiplexer control signals for each of the multiplexers 1620B, 1620C through 1620N of each signal processing unit 300. In this manner, the operands on the X bus and the Y bus can be aligned, matched, permuted and selected for performing a digital signal processing operation.

As those of ordinary skill will recognize, the present invention has many advantages. One advantage of the present invention is that operands of various data types for different digital signal processing applications can be processed in the application specific signal processor of the present invention. Another advantage of the present invention is that automatic data type matching is provided. Another advantage of the present invention is that operands can be automatically permuted through use of a permute field in an instruction or control register so that additional instructions to perform a desired permutation to the signal processors are unnecessary. Another advantage of the present invention is that the data type capabilities of the signal processing units can be easily expanded by adding additional signal processing units.

The preferred embodiments of the present invention are thus described. While certain exemplary embodiments of the present invention have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the present invention of data typing and aligning has been described with reference to memory access registers for accessing operands from memory but operands can be accessed from registers and can also be appropriately data typed and aligned by the present invention. While a 16-bit multiplier is utilized in the preferred embodiment of the invention, multipliers having larger bit widths may also be utilized and provide greater data type flexibility. Additionally., the data bus between the data memory and the signal-processing units maybe increased in size from 64-bits to 80-bits for example and provide greater data type flexibility. Furthermore, additional signal-processing units maybe provided such that larger bit widths of operands or a greater number of operands for processing together in a cycle may also be accommodated. Additionally, the present invention may be implemented in hardware, software, firmware or a combination thereof and utilized in systems, subsystems, components or sub-components thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. In any case, the present invention should not be construed as limited by such embodiments, but rather construed according to the claims that follow below.

What is claimed is:

1. A signal processor for performing digital signal processing instructions with operands having flexible data types, the signal processor comprising:
   at least one signal processing unit having,
      a first adder configured to add a pair of operands together;
      a first multiplier configured to multiply a pair of operands together; and
      a data typer and aligner configured to align and select a set of data bits on a first data bus as a first operand to couple into the first multiplier or the first adder, the alignment and selection of the set of data bits on the first data bus responsive to a first data type field.

2. The signal processor of claim 1, wherein, the data typer and aligner includes,
   a first multiplexer having an input coupled to the first data bus and an output coupled to a first input of the first adder, the first multiplexer to select the set of data bits on the first data bus for coupling into the first adder as the first operand; and
   a second multiplexer having an input coupled to the first data bus and an output coupled to a first input of the first multiplier, the second multiplexer to select the set of data bits on the first data bus for coupling into the first multiplier as the first operand.

3. The signal processor of claim 1 wherein,
   the alignment and selection of the set of data bits on the first data bus by the data typer and aligner is further responsive to a permute field.

4. The signal processor of claim 1 wherein,
   the data typer and aligner is further configured to align and select a set of data bits on a second data bus as a second operand to couple into the first multiplier or the first adder, the alignment and selection of the set of data bits on the second data bus responsive to a second data type field.

5. The signal processor of claim 4 wherein,
   the alignment and selection of the set of data bits on the first and second data bus by the data typer and aligner is further responsive to a permute field.

6. The signal processor of claim 4, wherein, the data typer and aligner includes,
   a first multiplexer having an input coupled to the first data bus and an output coupled to a first input of the first adder, the first multiplexer to select the set of data bits on the first data bus for coupling into the first adder as the first operand;
   a second multiplexer having an input coupled to the first data bus and an output coupled to a first input of the first multiplier, the second multiplexer to select the set of data bits on the first data bus for coupling into the first multiplier as the first operand;
   a third multiplexer having an input coupled to the second data bus and an output coupled to a second input of the first adder, the third multiplexer to select the set of data bits on the second data bus for coupling into the first adder as the second operand; and
   a fourth multiplexer having an input coupled to the second data bus and an output coupled to a second input of the first multiplier, the fourth multiplexer to select the set of data bits on the second data bus for coupling into the first multiplier as the second operand.

7. The signal processor of claim 1, wherein,
   the first data type field is in an access control register.

8. The signal processor of claim 1, wherein,
   the first data type field is in a digital signal processing instruction.

9. A signal processor to execute digital signal processing instructions having operands with flexible data types, the signal processor comprising:

a plurality of signal processing units having,
   a first adder configured to add a pair of operands together;
   a first multiplier configured to multiply a pair of operands together; and
   a data typer and aligner coupled to the first adder and the first multiplier,
      the data typer and aligner configured to align and selectively select a first set of data bits on a first data bus as a first operand for coupling into the first multiplier or the first adder responsive to a first data type field, and
      the data typer and aligner configured to align and selectively select a second set of data bits on a second data bus as a second operand for coupling into the first multiplier or the first adder responsive to a second data type field.

10. The signal processor of claim 9, wherein, the data typer and aligner includes,
   a first multiplexer having an input coupled to the first data bus and an output coupled to a first input of the first adder, the first multiplexer to select the first set of data bits on the first data bus for coupling into the first adder as the first operand;
   a second multiplexer having an input coupled to the first data bus and an output coupled to a first input of the first multiplier, the second multiplexer to select the first set of data bits on the first data bus for coupling into the first multiplier as the first operand;
   a third multiplexer having an input coupled to the second data bus and an output coupled to a second input of the first adder, the third multiplexer to select the second set of data bits on the second data bus for coupling into the first adder as the second operand; and
   a fourth multiplexer having an input coupled to the second data bus and an output coupled to a second input of the first multiplier, the fourth multiplexer to select the second set of data bits on the second data bus for coupling into the first multiplier as the second operand.

11. The signal processor of claim 9 wherein,
   the alignment and selection of the first set of data bits on the first data bus and the second set of data bits on the second data bus by the data typer and aligner is further responsive to a permute field.

12. The signal processor of claim 9, wherein,
   the first data type field and the second data type field are stored in an access control register.

13. The signal processor of claim 9, wherein,
   the first data type field and the second data type field are provided in a digital signal processing instruction.

14. The signal processor of claim 13, further comprising:
   an instruction decoder to decode the digital signal processing instruction and read the first data type field and the second data type field.

15. The signal processor of claim 9, wherein,
   a first data type for the first operand designated by the first data type field is a real number and a second data type for the second operand designated by the second data type field is a real number.

16. The signal processor of claim 15, wherein,
   the first data type has a width selected from the group consisting of four, eight, sixteen, thirty-two, and forty bits wide and the second data type has a width selected from the group consisting of four, eight, sixteen, thirty-two, and forty bits wide.

17. The signal processor of claim 9, wherein,
   a first data type for the first operand designated by the first data type field is a complex number and a second data type for the second operand designated by the second data type field is a complex number.

18. The signal processor of claim 17, wherein,
   the first data type has a width selected from the group consisting of four, eight, sixteen, thirty-two, and forty bits wide and the second data type has a width selected from the group consisting of four, eight, sixteen, thirty-two, and forty bits wide.

19. A signal processor to execute digital signal processing instructions having operands with flexible data types, the signal processor comprising:
   an instruction decoder to decode a digital signal processing instruction and read a first data type field, a second data type field, and a permute field;
   a plurality of signal processing units having,
      a first adder configured to add a pair of operands together;
      a first multiplier configured to multiply a pair of operands together; and
      a data typer and aligner coupled to the first adder and the first multiplier,
         the data typer and aligner configured to align and selectively select a first set of data bits on a first data bus as a first operand for coupling into the first multiplier or the first adder responsive to the first data type field and the permute field, and
         the data typer and aligner configured to align and selectively select a second set of data bits on a second data bus as a second operand for coupling into the first multiplier or the first adder responsive to a second data type field and the permute field.

20. The signal processor of claim 19, wherein,
   a first data type for the first operand designated by the first data type field is a real number and a second data type for the second operand designated by the second data type field is a real number.

21. The signal processor of claim 20, wherein,
   the first data type has a width selected from the group consisting of four, eight, sixteen, thirty-two, and forty bits wide and the second data type has a width selected from the group consisting of four, eight, sixteen, thirty-two, and forty bits wide.

22. The signal processor of claim 19, wherein,
   a first data type for the first operand designated by the first data type field is a complex number and a second data type for the second operand designated by the second data type field is a complex number.

23. The signal processor of claim 22, wherein,
   the first data type has a width selected from the group consisting of four, eight, sixteen, thirty-two, and forty bits wide and the second data type has a width selected from the group consisting of four, eight, sixteen, thirty-two, and forty bits wide.

24. A signal processor to execute digital signal processing instructions having operands with flexible data types, the signal processor comprising:
   a first signal processing unit having,
      a first adder configured to add a first pair of operands together;
      a first multiplier configured to multiply the first pair of operands together; and
      a first data typer and aligner coupled to the first adder and the first multiplier, the first data typer and aligner in response to a pair of data types to select the first pair of operands from a plurality of bits and to couple the first pair of operands to the first adder and the first multiplier.

25. The signal processor of claim 24, wherein, the first multiplier to multiply the first pair of operands together in response to a multiply instruction.

26. The signal processor of claim 24, wherein, the first adder to add the first pair of operands together in response to an add instruction.

27. The signal processor of claim 24, further comprising:

a second signal processing unit having,
- a second adder configured to add a second pair of operands together;
- a second multiplier configured to multiply the second pair of operands together; and
- a second data typer and aligner coupled to the second adder and the second multiplier,
- in response to the pair of data types, the second data typer and aligner to select the second pair of operands from the plurality of bits and to couple the second pair of operands to the second adder and the second multiplier.

28. The signal processor of claim 27, further comprising:

a third signal processing unit having,
- a third adder configured to add a third pair of operands together;
- a third multiplier configured to multiply the third pair of operands together; and
- a third data typer and aligner coupled to the third adder and the third multiplier,
- in response to the pair of data types, the third data typer and aligner to select the third pair of operands from the plurality of bits and to couple the third pair of operands to the third adder and the third multiplier.

29. The signal processor of claim 28, further comprising:

a fourth signal processing unit having,
- a fourth adder configured to add a fourth pair of operands together;
- a fourth multiplier configured to multiply the fourth pair of operands together; and
- a fourth data typer and aligner coupled to the fourth adder and the fourth multiplier,
- in response to the pair of data types, the fourth data typer and aligner to select the fourth pair of operands from a plurality of bits and to couple the fourth pair of operands to the fourth adder and the fourth multiplier.

30. The signal processor of claim 29, wherein:

in response to a permute field, one operand is selected by each data typer and aligner as one of the pair of operands.

31. The signal processor of claim 29, wherein:

each data typer and aligner to further match bit widths of each pair of operands in response to the pair of data types.

32. The signal processor of claim 31, wherein:

each data typer and aligner to fill bit positions using zeros.

33. The signal processor of claim 24, further comprising:

an instruction decoder to decode a digital signal processing instruction to read the pair of data types.

* * * * *